(12) United States Patent
Mailliard et al.

(10) Patent No.: US 12,514,921 B2
(45) Date of Patent: Jan. 6, 2026

(54) COMPOSITIONS AND METHODS FOR TREATING HIV INFECTION AND REVERSING HIV LATENCY

(71) Applicant: UNIVERSITY OF PITTSBURGH-OF THE COMMONWEALTH SYSTEM OF HIGHER EDUCATION, Pittsburgh, PA (US)

(72) Inventors: Robbie B. Mailliard, Pittsburgh, PA (US); Charles R. Rinaldo, Jr., Pittsburgh, PA (US); Jan Kristoff, Burgettstown, PA (US)

(73) Assignee: UNIVERSITY OF PITTSBURGH-OF THE COMMONWEALTH SYSTEM OF HIGHER EDUCATION, Pittsburgh, PA (US)

(*) Notice: Subject to any disclaimer, the term of this patent is extended or adjusted under 35 U.S.C. 154(b) by 810 days.

(21) Appl. No.: 17/620,204

(22) PCT Filed: Jun. 26, 2020

(86) PCT No.: PCT/US2020/039843
§ 371 (c)(1),
(2) Date: Dec. 17, 2021

(87) PCT Pub. No.: WO2020/264310
PCT Pub. Date: Dec. 30, 2020

(65) Prior Publication Data
US 2022/0249653 A1 Aug. 11, 2022

Related U.S. Application Data

(60) Provisional application No. 62/867,501, filed on Jun. 27, 2019.

(51) Int. Cl.
| | | |
|---|---|---|
| A61K 39/21 | (2006.01) | |
| A61K 39/245 | (2006.01) | |
| A61K 40/11 | (2025.01) | |
| A61K 40/24 | (2025.01) | |
| A61K 40/42 | (2025.01) | |
| A61K 40/45 | (2025.01) | |
| A61K 40/46 | (2025.01) | |
| A61P 31/18 | (2006.01) | |
| C12N 5/0784 | (2010.01) | |
| G01N 33/50 | (2006.01) | |
| G01N 33/68 | (2006.01) | |

(52) U.S. Cl.
CPC ............ *A61K 39/21* (2013.01); *A61K 39/245* (2013.01); *A61K 40/11* (2025.01); *A61K 40/24* (2025.01); *A61K 40/4215* (2025.01); *A61K 40/4532* (2025.01); *A61K 40/46* (2025.01); *A61P 31/18* (2018.01); *C12N 5/0639* (2013.01); *G01N 33/505* (2013.01); *G01N 33/5091* (2013.01); *G01N 33/6872* (2013.01); *C12N 2501/2301* (2013.01); *C12N 2501/2306* (2013.01); *C12N 2501/24* (2013.01); *C12N 2501/25* (2013.01); *C12N 2710/16122* (2013.01); *C12N 2710/16133* (2013.01); *C12N 2740/16022* (2013.01); *C12N 2740/16033* (2013.01); *C12N 2740/16122* (2013.01); *C12N 2740/16222* (2013.01)

(58) Field of Classification Search
None
See application file for complete search history.

(56) References Cited

U.S. PATENT DOCUMENTS
7,972,847 B2  7/2011  Kalinski

FOREIGN PATENT DOCUMENTS
| | | |
|---|---|---|
| WO | 2007/121429 | 10/2007 |
| WO | 2010/099169 | 9/2010 |
| WO | 2011/042180 | 4/2011 |
| WO | 2013/165592 | 11/2013 |

OTHER PUBLICATIONS

Kristoff et al., EBioMedicine, Apr. 2019, 43:295-306. (Year: 2019).*
Mosca et al., Nature, 1987, 325:67-70. (Year: 1987).*
International Search Report and Written Opinion dated Sep. 30, 2020, from International Application No. PCT/US2020/039843, 14 pages.
Kristoff, J. et al. "Type 1-programmed dendritic cells drive antigen-specific latency reversal and immune elimination of persistent HIV-1", EBioMedicine 43 (2019) 295-306.
International Preliminary Report on Patentability issued for Application No. PCT/US2020/039843, dated Jan. 6, 2022.
Abana CO, Pilkinton MA, Gaudieri S, Chopra A, McDonnell WJ, Wanjalla C, et al. Cytomegalovirus (CMV) Epitope-Specific CD4(+) T Cells Are Inflated in HIV(+) CMV(+) Subjects. J Immunol. 2017;199(9):3187-201.
Abdel-Mohsen M, Chavez L, Tandon R, Chew GM, Deng X, Danesh A, et al. Human Galectin-9 is a potent mediator of HIV transcription and reactivation. PLoS Pathog 2016;12(6):e1005677.
Ajani JA, Jiang Y, Faust J, Chang BB, Ho L, Yao JC, et al. A multi-center phase II study of sequential paclitaxel and bryostatin-1 (NSC 339555) in patients with untreated, advanced gastric or gastroesophageal junction adenocarcinoma. Invest New Drugs. 2006;24(4):353-7.

(Continued)

*Primary Examiner* — Nicole Kinsey White
(74) *Attorney, Agent, or Firm* — Meunier Carlin & Curfman LLC

(57) ABSTRACT

Disclosed herein are compositions and uses thereof for detecting HIV latency reversal, isolating cells with HIV latency reversal, treating HIV infection, and/or reversing latency in HIV infected CD4+ T cells. In some aspects, disclosed herein is a composition and uses thereof for treating HIV infection, wherein the composition comprises one or more mature monocyte-derived dendritic cells (MDGs) having an HIV peptide bound to a Class I major histocompatibility complex (MHC) molecule and a herpesvirus peptide bound to one or more Class II MHC molecules.

8 Claims, 21 Drawing Sheets
Specification includes a Sequence Listing.

(56) References Cited

OTHER PUBLICATIONS

Barry PA, Pratt-Lowe E, Peterlin BM, Luciw PA. Cytomegalovirus activates transcription directed by the long terminal repeat of human immunodeficiency virus type 1. J Virol 1990;64(6):2932-40.
Bennett SR, Carbone FR, Karamalis F, Flavell RA, Miller JF, Heath WR. Help for cytotoxic-T-cell responses is mediated by CD40 signalling. Nature. 1998;393(6684):478-80.
Borducchi EN, Cabral C, Stephenson KE, Liu J, Abbink P, Ng'ang'a D, et al. Ad26/MVA therapeutic vaccination with TLR7 stimulation in SIV-infected rhesus monkeys. Nature. 2016;540(7632):284-7.
Borducchi EN, Liu J, Nkolola JP, Cadena AM, Yu WH, Fischinger S, et al. Publisher Correction: Antibody and TLR7 agonist delay viral rebound in SHIV-infected monkeys. Nature. 2018;564(7734):E8.
Boucau J, Le Gall S. Antigen processing and presentation in HIV infection. Mol Immunol. 2018.
Brenchley JM, Ruff LE, Casazza JP, Koup RA, Price DA, Douek DC. Preferential infection shortens the life span of human immunodeficiency virus-specific CD4+ T cells in vivo. J Virol 2006;80(14):6801-9.
Brezar V, Ruffin N, Richert L, Surenaud M, Lacabaratz C, Palucka K, et al. Decreased HIV-specific T-regulatory responses are associated with effective DC-vaccine induced immunity. PLoS pathogens. 2015;11(3):e1004752.
Bruner KM, Hosmane NN, Siliciano RF. Towards an HIV-1 cure: measuring the latent reservoir. Trends Microbiol. 2015;23(4):192-203.
Bruner KM, Murray AJ, Pollack RA, Soliman MG, Laskey SB, Capoferri AA, et al. Defective proviruses rapidly accumulate during acute HIV-1 infection. Nat Med. 2016;22(9):1043-9.
Bui JK, Sobolewski MD, Keele BF, Spindler J, Musick A, Wiegand A, et al. Proviruses with identical sequences comprise a large fraction of the replication-competent HIV reservoir. PLoS Pathog 2017;13(3):e1006283.
Bullen CK, Laird GM, Durand CM, Siliciano JD, Siliciano RF. New ex vivo approaches distinguish effective and ineffective single agents for reversing HIV-1 latency in vivo. Nature medicine. 2014;20(4):425-9.
Buzonmj, Sun H, Li C, Shaw A, Seiss K, Ouyang Z, et al. HIV-1 persistence in CD4+T cells with stem cell-like properties. Nat Med 2014;20(2):139-42.
Casazza JP, Brenchley JM, Hill BJ, Ayana R, Ambrozak D, Roederer M, et al. Autocrine production of beta-chemokines protects CMV-specific CD4 T cells from HIV infection. PLoS Pathog 2009;5(10):e1000646.
Cella M, Scheidegger D, Palmer-Lehmann K, Lane P, Lanzavecchia A, Alber G. Ligation of CD40 on dendritic cells triggers production of high levels of interleukin-12 and enhances T cell stimulatory capacity: T-T help via APC activation. J Exp Med. 1996;184(2):747-52.
Chen BK, Gandhi RT, Baltimore D. CD4 down-modulation during infection of human T cells with human immunodeficiency virus type 1 involves independent activities of vpu, env, and nef. J Virol. 1996;70(9):6044-53.
Christensen-Quick A, Chaillon A, Yek C, Zanini F, Jordan P, Ignacio C, et al. Influenza vaccination can broadly activate the HIV reservoir during antiretroviral therapy. J Acquir Immune Defic Syndr 2018;79(3) (e104-e7).
Christensen-Quick A, Vanpouille C, Lisco A, Gianella S. Cytomegalovirus and HIV persistence: pouring gas on the fire. AIDS Res Hum Retroviruses 2017;33:S23-30.
Clutton G, Xu Y, Baldoni PL, Mollan KR, Kirchherr J, Newhard W, et al. The differential short- and long-term effects of HIV-1 latency-reversing agents on T cell function. Scientific reports. 2016;6:30749.
Cohn LB, Silva IT, Oliveira TY, Rosales RA, Parrish EH, Learn GH, et al. HIV-1 integration landscape during latent and active infection. Cell 2015;160(3):420-32.
Connolly NC, Whiteside TL, Wilson C, Kondragunta V, Rinaldo CR, Riddler SA. Therapeutic immunization with human immunodeficiency virus type 1 (HIV-1) peptide-loaded dendritic cells is safe and induces immunogenicity in HIV-1-infected individuals. Clinical and vaccine immunology : CVI. 2008;15(2):284-92.
Dan JM, Massanella M, Smith DM, Spina CA, Schrier R, Daar ES, et al. Brief report: effect of CMV and HIV transcription on CD57 and PD-1 T-cell expression during suppressive Art. J Acquir Immune Defic Syndr 2016;72(2):133-7.
Deeks SG. HIV: Shock and kill. Nature. 2012;487(7408):439-40.
Demoustier A, Gubler B, Lambotte O, de Goer MG, Wallon C, Goujard C, et al. In patients on prolonged HAART, a significant pool of HIV infected CD4 T cells are HIV-specific. AIDS. 2002;16(13):1749-54.
Douek DC, Brenchley JM, Betts MR, Ambrozak DR, Hill BJ, Okamoto Y, et al. HIV preferentially infects HIV-specific CD4+ T cells. Nature. 2002;417(6884):95-8.
Feau S, Garcia Z, Arens R, Yagita H, Borst J, Schoenberger SP. The CD4(+) T-cell help signal is transmitted from APC to CD8(+) T-cells via CD27-CD70 interactions. Nature communications. 2012;3:948.
Freeman ML, Lederman MM, Gianella S. Partners in crime: the role of CMV in immune Dysregulation and clinical outcome during HIV infection. Curr HIV/AIDS Rep 2016;13(1):10-9.
Garcia F, Climent N, Guardo AC, Gil C, Leon A, Autran B, et al. A dendritic cell-based vaccine elicits T cell responses associated with control of HIV-1 replication. Science translational medicine. 2013;5(166):166ra2.
Gianella S, Anderson CM, Var SR, Oliveira MF, Lada SM, Vargas MV, et al. Replication of human Herpesviruses is associated with higher HIV DNA levels during antiretroviral therapy started at early phases of HIV infection. J Virol 2016;90(8):3944-52.
Gianella S, Anderson CM, Vargas MV, Richman DD, Little SJ, Morris SR, et al. Cytomegalovirus DNA in semen and blood is associated with higher levels of proviral HIV DNA. J Infect Dis 2013;207(6):898-902.
Gianella S, Chaillon A, Mutlu EA, Engen PA, Voigt RM, Keshavarzian A, et al. Effect of cytomegalovirus and Epstein-Barr virus replication on intestinal mucosal gene expression and microbiome composition of HIV-infected and uninfected individuals. AIDS 2017;31(15):2059-67.
Gianella S, Massanella M, Richman DD, Little SJ, Spina CA, VargasMV, et al. Cytomegalovirus replication in semen is associated with higher levels of proviral HIV DNA and CD4+ T cell activation during antiretroviral treatment. J Virol 2014;88(14):7818-27.
Goulder PJ, Watkins DI. HIV and SIV CTL escape: implications for vaccine design. Nat Rev Immunol. 2004;4(8):630-40.
Gutierrez C, Serrano-Villar S, Madrid-Elena N, Perez-Elias MJ, Martin ME, Barbas C, et al. Bryostatin-1 for latent virus reactivation in HIV-infected patients on antiretroviral therapy. AIDS. 2016;30(9):1385-92.
Henrich TJ, Hobbs KS, Hanhauser E, Scully E, Hogan LE, Robles YP, et al. Human immunodeficiency virus type 1 Persistence following systemic chemotherapy for malignancy. J Infect Dis 2017;216(2):254-62.
Hosmane NN, Kwon KJ, Bruner KM, Capoferri AA, Beg S, Rosenbloom DI, et al. Proliferation of latently infected CD4(+) T cells carrying replication-competent HIV-1: potential role in latent reservoir dynamics. J Exp Med 2017;214(4):959-72.
Huang SH, Ren Y, Thomas AS, Chan D, Mueller S, Ward AR, et al. Latent HIV reservoirs exhibit inherent resistance to elimination by CD8+ T cells. J Clin Invest. 2018;128(2):876-89.
Jan Kristoff, Programming Dendritic Cells for The 'Kick And Kill' Of Latent HIV-1, Dissertation, 1993, 177 pages.
Johnson EL, Howard CL, Thurman J, Pontiff K, Johnson ES, Chakraborty R. Cytomegalovirus upregulates expression of CCR5 in central memory cord bloodmononuclear cells, whichmay facilitate in utero HIV type 1 transmission. J Infect Dis 2015;211(2):187-96.
Jones RB, Mueller S, O'Connor R, Rimpel K, Sloan DD, Karel D, et al. A subset of latency-reversing agents expose HIV-infected resting CD4+ T-cells to recognition by cytotoxic T-lymphocytes. PLoS Pathog 2016;12(4):e1005545.

(56) References Cited

OTHER PUBLICATIONS

Jones RB, O'Connor R, Mueller S, Foley M, Szeto GL, Karel D, et al. Histone deacetylase inhibitors impair the elimination of HIV-infected cells by cytotoxic T-lymphocytes. PLoS pathogens. 2014;10(8):e1004287.

Jones RB, Walker BD. HIV-specific CD8(+) T cells and HIV eradication. J Clin Invest. 2016;126(2):455-63.

Komanduri KV, Donahoe SM, MorettoWJ, Schmidt DK, Gillespie G, Ogg GS, et al. Direct measurement of CD4+ and CD8+ T-cell responses to CMV in HIV-1-infected subjects. Virology 2001;279(2):459-70.

Kristoff J, Palma ML, Garcia-Bates TM, Shen C, Sluis-Cremer N, Gupta P, Rinaldo CR, Mailliard RB. Type 1-programmed dendritic cells drive antigen-specific latency reversal and immune elimination of persistent HIV-1. EBioMedicine. Apr. 2, 2019. pii: S2352-3964(19)30222-1. doi: 10.1016/j.ebiom.2019.03.077. [Epub ahead of print] PMID: 30952614.

Lam AP, Sparano JA, Vinciguerra V, Ocean AJ, Christos P, Hochster H, et al. Phase II study of paclitaxel plus the protein kinase C inhibitor bryostatin-1 in advanced pancreatic carcinoma. Am J Clin Oncol. 2010;33(2):121-4.

Levy Y, Thiebaut R, Montes M, Lacabaratz C, Sloan L, King B, et al. Dendritic cell-based therapeutic vaccine elicits polyfunctional HIV-specific T-cell immunity associated with control of viral load. Eur J Immunol. 2014;44(9):2802-10.

Li H, Margolick JB, Bream JH, Nilles TL, Langan S, Bui HT, et al. Heterogeneity of CD4+ and CD8+ T-cell responses to cytomegalovirus in HIV-infected and HIV-uninfected men who have sex with men. The Journal of infectious diseases. 2014;210(3):400-4.

Lorenzi JC, Cohen YZ, Cohn LB, Kreider EF, Barton JP, Learn GH, et al. Paired quantitative and qualitative assessment of the replication-competent HIV-1 reservoir and comparison with integrated proviral DNA. Proc Natl Acad Sci U S A 2016;113(49) (E7908-E16).

Macatangay BJ, Riddler SA, Wheeler ND, Spindler J, Lawani M, Hong F, et al. Therapeutic Vaccination With Dendritic Cells Loaded With Autologous HIV Type 1-Infected Apoptotic Cells. The Journal of infectious diseases. 2016;213(9):1400-9.

Maidji E, Somsouk M, Rivera JM, Hunt PW, Stoddart CA. Replication of CMV in the gut of HIV-infected individuals and epithelial barrier dysfunction. PLoS Pathog 2017;13(2):e1006202.

Maile R, Siler CA, Kerry SE, Midkiff KE, Collins EJ, Frelinger JA. Peripheral "CD8 tuning" dynamically modulates the size and responsiveness of an antigen-specific T cell pool in vivo. J Immunol. 2005;174(2):619-27.

Mailliard RB, Smith KN, Fecek RJ, Rappocciolo G, Nascimento EJ, Marques ET, et al. Selective Induction of CTL Helper Rather Than Killer Activity by Natural Epitope Variants Promotes Dendritic Cell-Mediated HIV-1 Dissemination. J Immunol. 2013;191(5):2570-80.

Mailliard RB, Son YI, Redlinger R, Coates PT, Giermasz A, Morel PA, et al. Dendritic cells mediate NK cell help for Th1 and CTL responses: two-signal requirement for the induction of NK cell helper function. J Immunol 2003;171(5):2366-73.

Mailliard RB, Wankowicz-Kalinska A, Cai Q, Wesa A, Hilkens CM, Kapsenberg ML, et al. alpha-type-1 polarized dendritic cells: a novel immunization tool with optimized CTL-inducing activity. Cancer Res. 2004;64(17):5934-7.

Kristoff, Mailliard, et al., Dendritic cells drive antigen-specific exposure and immune elimination of HIV latently infected CD4 T cells. 22nd International AIDS Conference, 2018 Amsterdam, NE.

Maldarelli F,Wu X, Su L, Simonetti FR, ShaoW, Hill S, et al. HIV latency. Specific HIV integration sites are linked to clonal expansion and persistence of infected cells. Science 2014;345(6193):179-83.

Marini A, Harper JM, Romerio F. An in vitro system to model the establishment and reactivation of HIV-1 latency. J Immunol 2008;181(11):7713-20.

McCarthy M, Auger D, He J, Wood C. Cytomegalovirus and human herpesvirus-6 trans-activate the HIV-1 long terminal repeat via multiple response regions in human fetal astrocytes. J Neurovirol 1998;4(5):495-511.

Morgan RJ, Jr., Leong L, Chow W, Gandara D, Frankel P, Garcia A, et al. Phase II trial of bryostatin-1 in combination with cisplatin in patients with recurrent or persistent epithelial ovarian cancer: a California cancer consortium study. Invest New Drugs. 2012;30(2):723-8.

Murayama T, Ohara Y, ObuchiM, Khabar KS, Higashi H, Mukaida N, et al. Human cytomegalovirus induces interleukin-8 production by a human monocytic cell line, THP-1, through acting concurrently on AP-1- and NF-kappaB-binding sites of the interleukin-8 gene. J Virol 1997;71(7):5692-5.

Naeger DM, Martin JN, Sinclair E, Hunt PW, Bangsberg DR, Hecht F, et al. Cytomegalovirus-specific T cells persist at very high levels during long-term antiretroviral treatment of HIV disease. PLoS One 2010;5(1):e8886.

Norton TD, Miller EA, Bhardwaj N, Landau NR. Vpx-containing dendritic cell vaccine induces CTLs and reactivates latent HIV-1 in vitro. Gene Ther 2015;22(3):227-36.

Perreau M, Savoye AL, De Crignis E, Corpataux JM, Cubas R, Haddad EK, et al. Follicular helper T cells serve as the major CD4 T cell compartment for HIV-1 infection, replication, and production. J Exp Med 2013;210(1):143-56.

Poizot-Martin I, Allavena C, Duvivier C, Cano CE, Guillouet de Salvador F, Rey D, et al. CMV+ Serostatus associates negatively with CD4:CD8 ratio normalization in controlled HIV-infected patients on cART. PLoS One 2016;11(11):e0165774.

Pollack RA, Jones RB, Pertea M, Bruner KM, Martin AR, Thomas AS, et al. Defective HIV-1 Proviruses Are Expressed and Can Be Recognized by Cytotoxic T Lymphocytes, which Shape the Proviral Landscape. Cell host & microbe. 2017;21(4):494-506.e4.

Ren XX, Ma L, SunWW, KuangWD, Li TS, Jin X, et al. Dendritic cellsmaturated by coculturing with HIV-1 latently infected Jurkat T cells or stimulating with AIDSassociated pathogens secrete TNF-alpha to reactivate HIV-1 from latency. Virulence 2017;8(8):1732-43.

Richman DD, Margolis DM, Delaney M, Greene WC, Hazuda D, Pomerantz RJ. The challenge of finding a cure for HIV infection. Science. 2009;323(5919):1304-7.

Ridge JP, Di Rosa F, Matzinger P. A conditioned dendritic cell can be a temporal bridge between a CD4+ T-helper and a T-killer cell. Nature. 1998;393(6684):474-8.

Ruelas DS, Greene WC. An integrated overview of HIV-1 latency. Cell. 2013;155(3):519-29.

Saleh S, Lu HK, Evans V, Harisson D, Zhou J, Jaworowski A, et al. HIV integration and the establishment of latency in CCL19-treated resting CD4(+) T cells require activation of NF-kappaB. Retrovirology 2016;13(1):49.

Sanyal A, Mailliard RB, Rinaldo CR, Ratner D, Ding M, Chen Y, et al. Novel assay reveals a large, inducible, replication-competent HIV-1 reservoir in resting CD4(+) T cells. Nature medicine. 2017;23(7):885-9.

Schmueck-Henneresse M, Sharaf R, Vogt K,Weist BJ, Landwehr-Kenzel S, Fuehrer H, et al. Peripheral blood-derived virus-specific memory stem T cells mature to functional effector memory subsets with self-renewal potency. J Immunol 2015;194(11):5559-67.

Schoenberger SP, Toes RE, van der Voort El, Offringa R, Melief CJ. T-cell help for cytotoxic T lymphocytes is mediated by CD40-CD40L interactions. Nature. 1998;393(6684):480-3.

Smith BD, Jones RJ, Cho E, Kowalski J, Karp JE, Gore SD, et al. Differentiation therapy in poor risk myeloid malignancies: Results of a dose finding study of the combination bryostatin-1 and GM-CSF. Leuk Res. 2011;35(1):87-94.

Smith DM, Nakazawa M, Freeman ML, Anderson CM, Oliveira MF, Little SJ, et al. Asymptomatic CMV replication during early human immunodeficiency virus (HIV) infection is associated with lower CD4/CD8 ratio during HIV treatment. Clin Infect Dis 2016;63(11):1517-24.

Smith KN, Mailliard RB, Piazza PA, Fischer W, Korber BT, Fecek RJ, et al. Effective Cytotoxic T Lymphocyte Targeting of Persistent HIV-1 during Antiretroviral Therapy Requires Priming of Naive CD8+ T Cells. mBio. 2016;7(3).

Spina CA, Anderson J, Archin NM, Bosque A, Chan J, Famiglietti M, et al. An in-depth comparison of latent HIV-1 reactivation in

(56) References Cited

OTHER PUBLICATIONS multiple cell model systems and resting CD4+ T cells from aviremic patients. PLoS pathogens. 2013;9(12):e1003834.

Stone SF, Price P, French MA. Cytomegalovirus (CMV)-specific CD8+ T cells in individuals with HIV infection: correlation with protection from CMV disease. J Antimicrob Chemother. 2006;57(4):585-8.

Sylwester AW, Mitchell BL, Edgar JB, Taormina C, Pelte C, Ruchti F, et al. Broadly targeted human cytomegalovirus-specific CD4+ and CD8+ T cells dominate the memory compartments of exposed subjects. J Exp Med 2005;202(5):673-85.

Tsai A, Irrinki A, Kaur J, Cihlar T, Kukolj G, Sloan DD, et al. Toll-Like Receptor 7 Agonist GS-9620 Induces HIV Expression and HIV-Specific Immunity in Cells from HIV-Infected Individuals on Suppressive Antiretroviral Therapy. J Virol. 2017;91(8).

Van der Sluis RM, vanMontfort T, Pollakis G, SandersRW, Speijer D, Berkhout B, et al. Dendritic cell-induced activation of latent HIV-1 provirus in actively proliferating primary T lymphocytes. PLoS Pathog 2013;9(3):e1003259.

Vibholm L, Schleimann MH, Hojen JF, Benfield T, Offersen R, Rasmussen K, et al. Short-Course Toll-Like Receptor 9 Agonist Treatment Impacts Innate Immunity and Plasma Viremia in Individuals With Human Immunodeficiency Virus Infection. Clin Infect Dis. 2017;64(12):1686-95.

Von Stockenstrom S, Odevall L, Lee E, Sinclair E, Bacchetti P, Killian M, et al. Longitudinal genetic characterization reveals that cell proliferation maintains a persistent HIV type 1 DNA Pool during effective HIV therapy. J Infect Dis 2015;212(4):596-607.

Wagner TA, McKernan JL, Tobin NH, Tapia KA, Mullins JI, Frenkel LM. An increasing proportion of monotypic HIV-1 DNA sequences during antiretroviral treatment suggests proliferation of HIV-infected cells. J Virol 2013;87(3):1770-8.

Wagner TA, McLaughlin S, Garg K, Cheung CY, Larsen BB, Styrchak S, et al. HIV latency. Proliferation of cells with HIV integrated into cancer genes contributes to persistent infection. Science 2014;345(6196):570-3.

Yek C, Gianella S, Plana M, Castro P, Scheffler K, Garcia F, et al. Standard vaccines increase HIV-1 transcription during antiretroviral therapy. AIDS 2016;30(15):2289-98.

Zaccard CR, Watkins SC, Kalinski P, Fecek RJ, Yates AL, Salter RD, et al. CD40L induces functional tunneling nanotube networks exclusively in dendritic cells programmed by mediators of type 1 immunity. J Immunol. 2015;194(3):1047-56.

Zhao M, De Crignis E, Rokx C, Verbon A, van Gelder T, Mahmoudi T, et al. T cell toxicity of HIV latency reversing agents. Pharmacol Res. 2019;139:524-34.

* cited by examiner

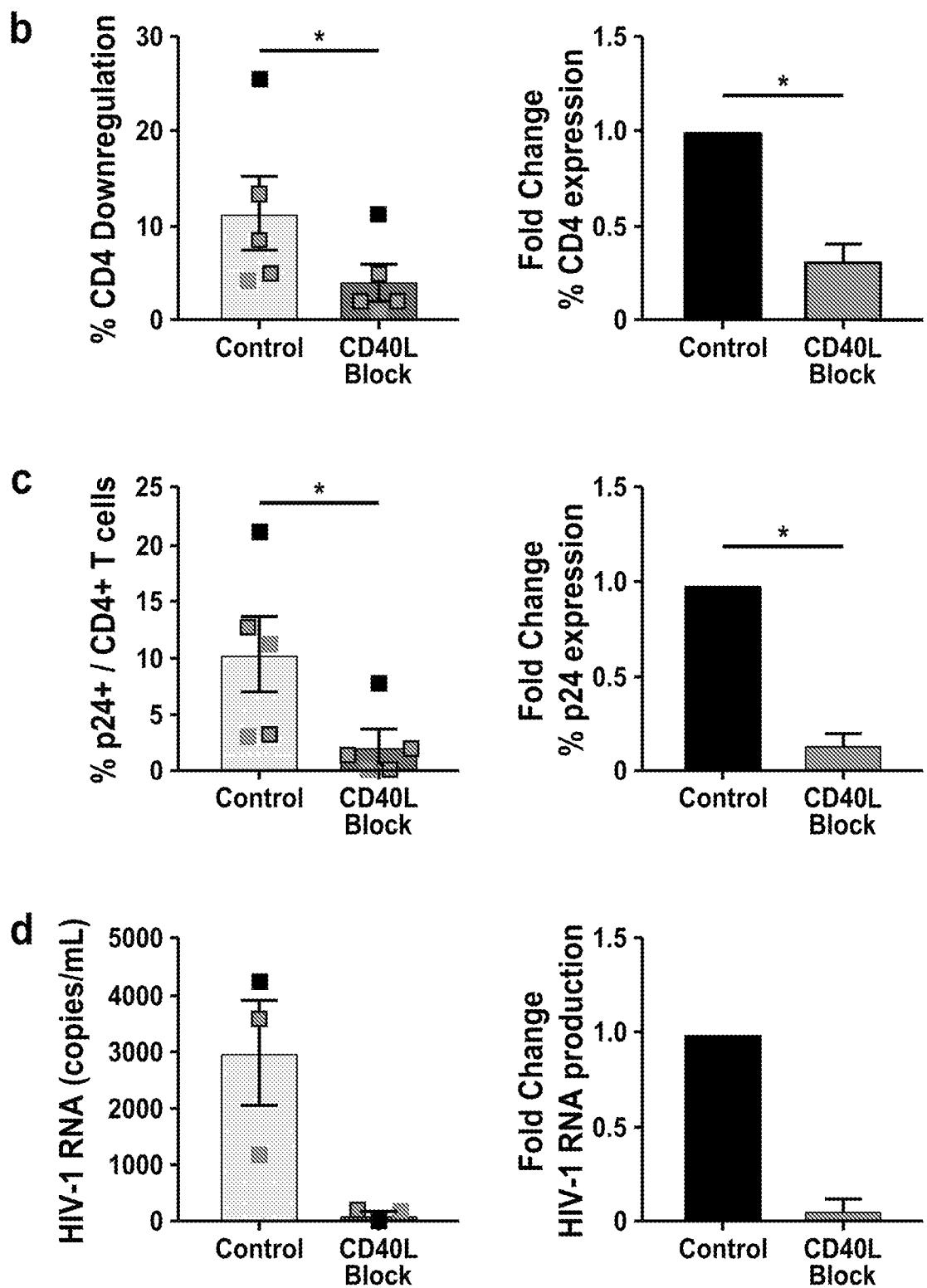
FIG. 4(B-D)

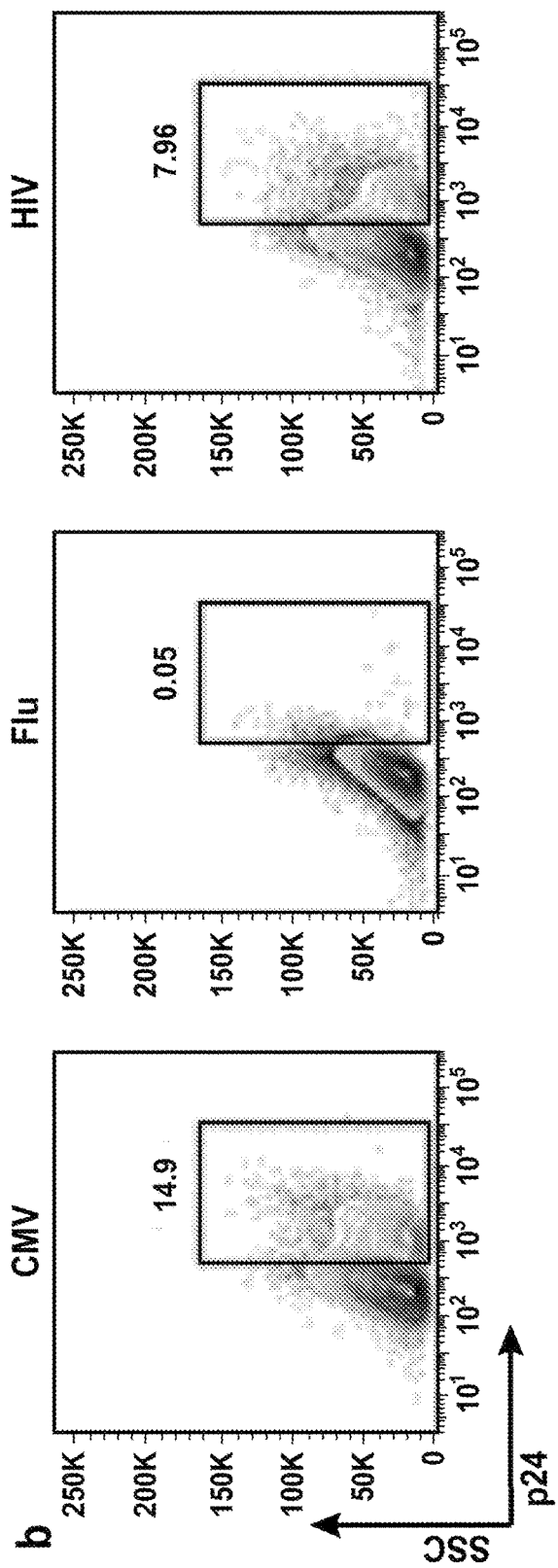
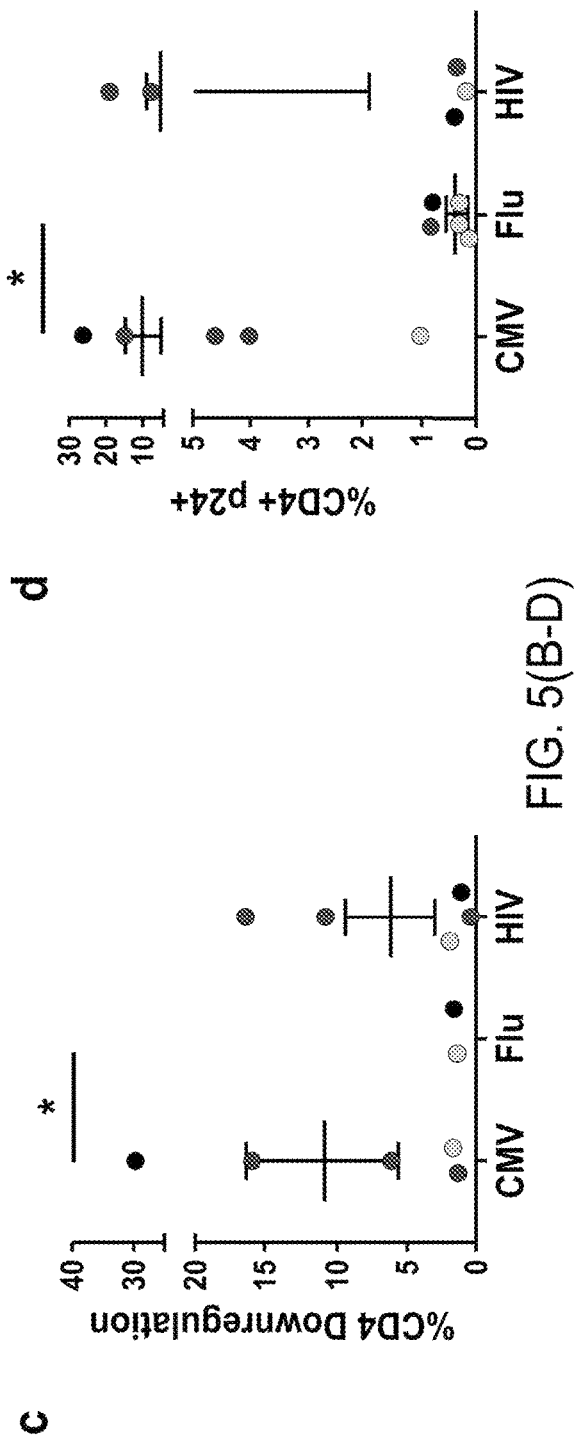
FIG. 5(B-D)

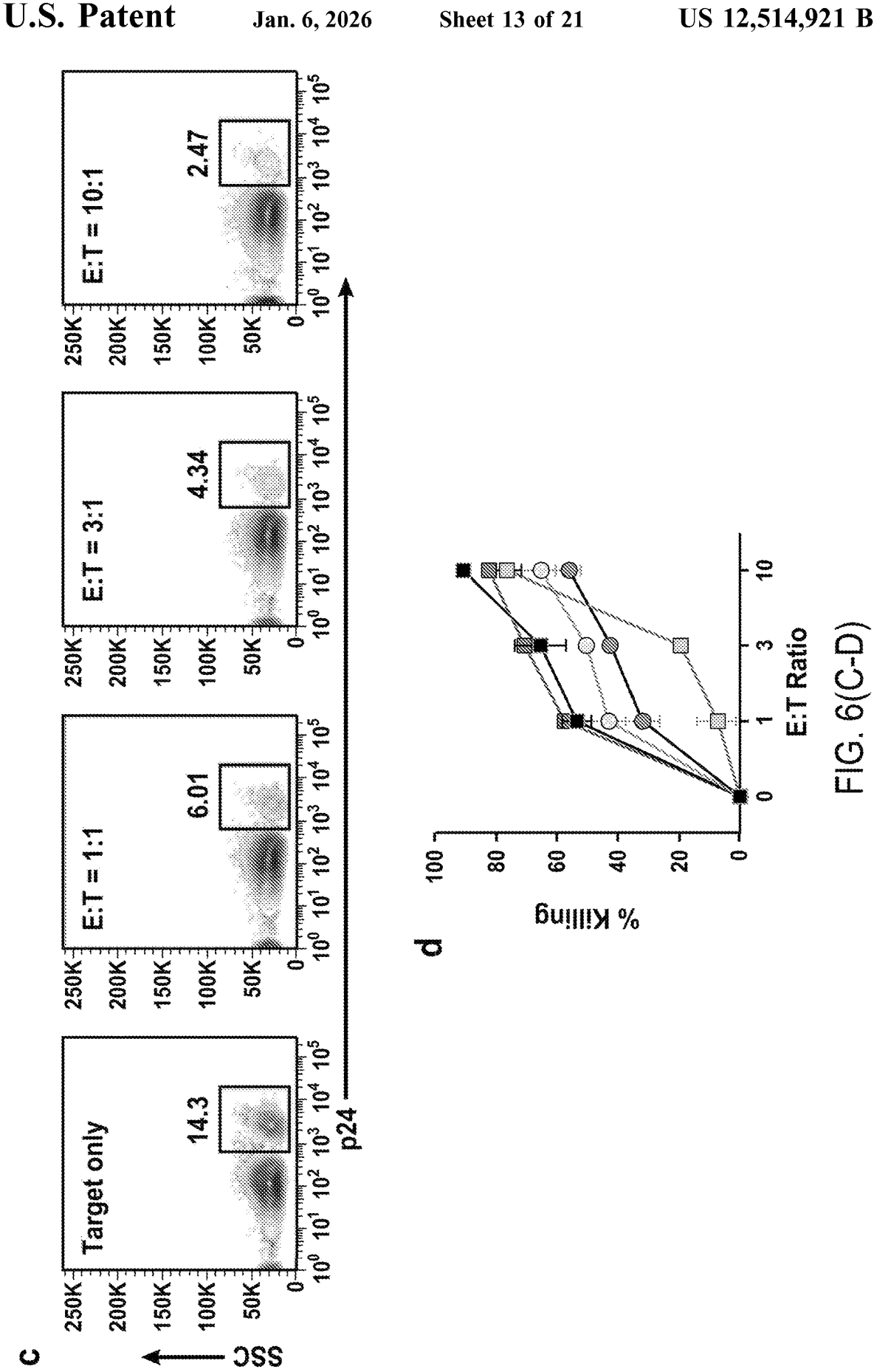
FIG. 6(C-D)

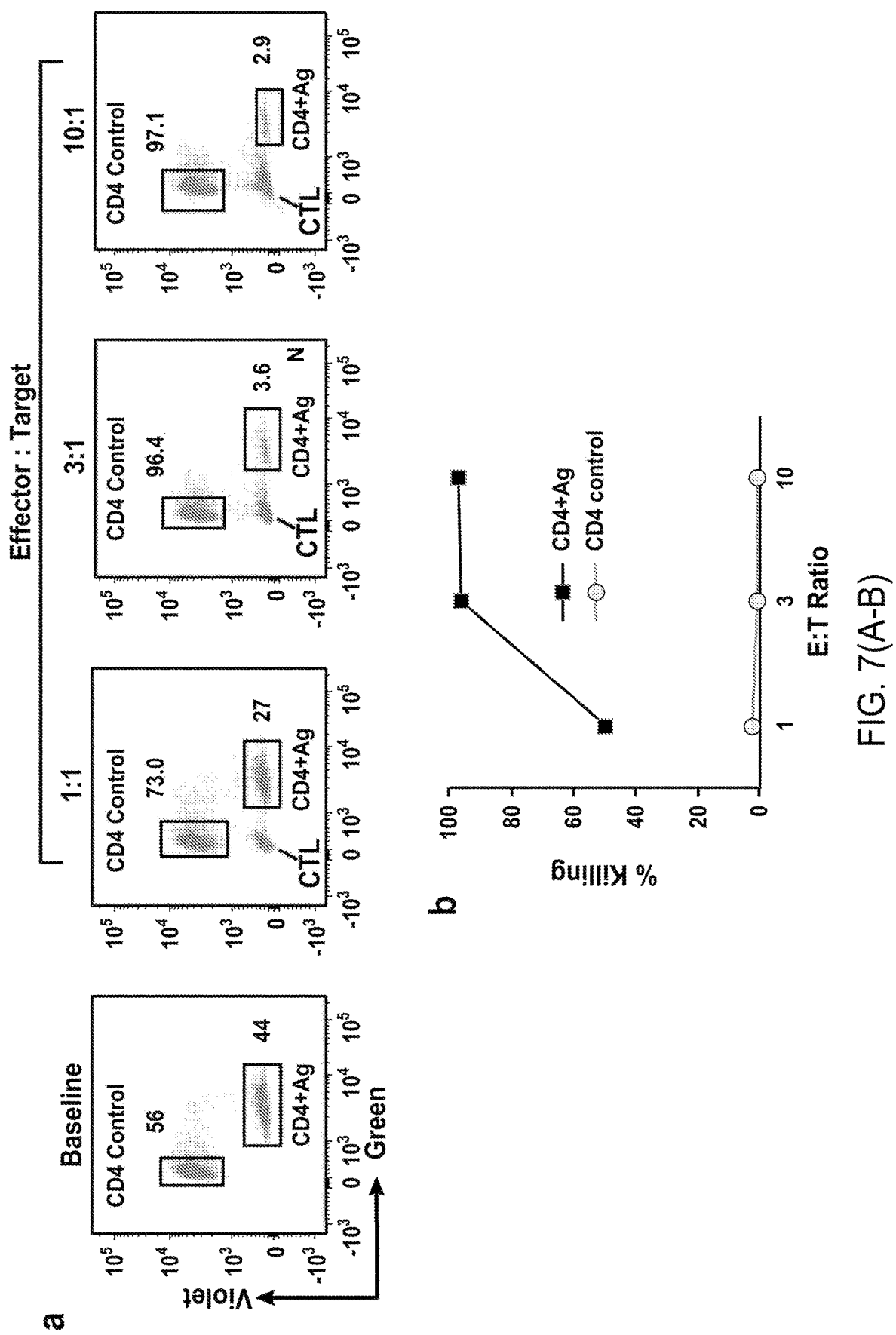
FIG. 7(A-B)

SEQUENCE LISTING

```
<160> NUMBER OF SEQ ID NOS: 13

<210> SEQ ID NO 1
<211> LENGTH: 9
<212> TYPE: PRT
<213> ORGANISM: Artificial Sequence
<220> FEATURE:
<223> OTHER INFORMATION: Synthetic construct

<400> SEQUENCE: 1

Thr Leu Asn Ala Trp Val Lys Val Val
1               5

<210> SEQ ID NO 2
<211> LENGTH: 9
<212> TYPE: PRT
<213> ORGANISM: Artificial Sequence
```

```
<220> FEATURE:
<223> OTHER INFORMATION: Synthetic construct

<400> SEQUENCE: 2

Ala Leu Asn Ala Trp Val Lys Val Val
1               5

<210> SEQ ID NO 3
<211> LENGTH: 9
<212> TYPE: PRT
<213> ORGANISM: Artificial Sequence
<220> FEATURE:
<223> OTHER INFORMATION: Synthetic construct

<400> SEQUENCE: 3

Thr Leu Asp Ala Trp Val Lys Val Val
1               5

<210> SEQ ID NO 4
<211> LENGTH: 9
<212> TYPE: PRT
<213> ORGANISM: Artificial Sequence
<220> FEATURE:
<223> OTHER INFORMATION: Synthetic construct

<400> SEQUENCE: 4

Pro Leu Asn Ala Trp Val Lys Val Val
1               5

<210> SEQ ID NO 5
<211> LENGTH: 9
<212> TYPE: PRT
<213> ORGANISM: Artificial Sequence
<220> FEATURE:
<223> OTHER INFORMATION: Synthetic construct

<400> SEQUENCE: 5

Thr Leu Ser Ala Trp Val Lys Val Val
1               5

<210> SEQ ID NO 6
<211> LENGTH: 9
<212> TYPE: PRT
<213> ORGANISM: Artificial Sequence
<220> FEATURE:
<223> OTHER INFORMATION: Synthetic construct

<400> SEQUENCE: 6

Asn Thr Val Ala Thr Leu Trp Cys Val
1               5

<210> SEQ ID NO 7
<211> LENGTH: 9
<212> TYPE: PRT
<213> ORGANISM: Artificial Sequence
<220> FEATURE:
<223> OTHER INFORMATION: Synthetic construct

<400> SEQUENCE: 7

Val Leu Ala Glu Ala Met Ser Gln Ala
1               5

<210> SEQ ID NO 8
<211> LENGTH: 9
<212> TYPE: PRT
<213> ORGANISM: Artificial Sequence
<220> FEATURE:
```

-continued

<223> OTHER INFORMATION: Synthetic construct

<400> SEQUENCE: 8

Glu Val Ile Pro Met Phe Ser Ala Leu
1               5

<210> SEQ ID NO 9
<211> LENGTH: 24
<212> TYPE: DNA
<213> ORGANISM: Artificial Sequence
<220> FEATURE:
<223> OTHER INFORMATION: Synthetic construct

<400> SEQUENCE: 9
cccatgtttt cagcattatc agaa                                          24

<210> SEQ ID NO 10
<211> LENGTH: 25
<212> TYPE: DNA
<213> ORGANISM: Artificial Sequence
<220> FEATURE:
<223> OTHER INFORMATION: Synthetic construct

<400> SEQUENCE: 10
ccactgtgtt tagcatggtg tttaa                                         25

<210> SEQ ID NO 11
<211> LENGTH: 15
<212> TYPE: DNA
<213> ORGANISM: Artificial Sequence
<220> FEATURE:
<223> OTHER INFORMATION: Synthetic constrcut

<400> SEQUENCE: 11
agccacccca caaga                                                    15

<210> SEQ ID NO 12
<211> LENGTH: 561
<212> TYPE: PRT
<213> ORGANISM: Cytomegalovirus

<400> SEQUENCE: 12

Met Glu Ser Arg Gly Arg Arg Cys Pro Glu Met Ile Ser Val Leu Gly
1               5                   10                  15

Pro Ile Ser Gly His Val Leu Lys Ala Val Phe Ser Arg Gly Asp Thr
            20                  25                  30

Pro Val Leu Pro His Glu Thr Arg Leu Leu Gln Thr Gly Ile His Val
        35                  40                  45

Arg Val Ser Gln Pro Ser Leu Ile Leu Val Ser Gln Tyr Thr Pro Asp
    50                  55                  60

Ser Thr Pro Cys His Arg Gly Asp Asn Gln Leu Gln Val Gln His Thr
65                  70                  75                  80

Tyr Phe Thr Gly Ser Glu Val Glu Asn Val Ser Val Asn Val His Asn
                85                  90                  95

Pro Thr Gly Arg Ser Ile Cys Pro Ser Gln Glu Pro Met Ser Ile Tyr
            100                 105                 110

Val Tyr Ala Leu Pro Leu Lys Met Leu Asn Ile Pro Ser Ile Asn Val
        115                 120                 125

His His Tyr Pro Ser Ala Ala Glu Arg Lys His Arg His Leu Pro Val
    130                 135                 140

Ala Asp Ala Val Ile His Ala Ser Gly Lys Gln Met Trp Gln Ala Arg

-continued

```
            145                 150                 155                 160
        Leu Thr Val Ser Gly Leu Ala Trp Thr Arg Gln Gln Asn Gln Trp Lys
                        165                 170                 175
        Glu Pro Asp Val Tyr Tyr Thr Ser Ala Phe Val Phe Pro Thr Lys Asp
                        180                 185                 190
        Val Ala Leu Arg His Val Val Cys Ala His Glu Leu Val Cys Ser Met
                        195                 200                 205
        Glu Asn Thr Arg Ala Thr Lys Met Gln Val Ile Gly Asp Gln Tyr Val
            210                 215                 220
        Lys Val Tyr Leu Glu Ser Phe Cys Glu Asp Val Pro Ser Gly Lys Leu
        225                 230                 235                 240
        Phe Met His Val Thr Leu Gly Ser Asp Val Glu Asp Leu Thr Met
                            245                 250                 255
        Thr Arg Asn Pro Gln Pro Phe Met Arg Pro His Glu Arg Asn Gly Phe
                        260                 265                 270
        Thr Val Leu Cys Pro Lys Asn Met Ile Ile Lys Pro Gly Lys Ile Ser
                        275                 280                 285
        His Ile Met Leu Asp Val Ala Phe Thr Ser His Glu His Phe Gly Leu
            290                 295                 300
        Leu Cys Pro Lys Ser Ile Pro Gly Leu Ser Ile Ser Gly Asn Leu Leu
        305                 310                 315                 320
        Met Asn Gly Gln Gln Ile Phe Leu Glu Val Gln Ala Ile Arg Glu Thr
                        325                 330                 335
        Val Glu Leu Arg Gln Tyr Asp Pro Val Ala Ala Leu Phe Phe Phe Asp
                        340                 345                 350
        Ile Asp Leu Leu Leu Gln Arg Gly Pro Gln Tyr Ser Glu His Pro Thr
                    355                 360                 365
        Phe Thr Ser Gln Tyr Arg Ile Gln Gly Lys Leu Glu Tyr Arg His Thr
                    370                 375                 380
        Trp Asp Arg His Asp Glu Gly Ala Ala Gln Gly Asp Asp Val Trp
        385                 390                 395                 400
        Thr Ser Gly Ser Asp Ser Asp Glu Glu Leu Val Thr Thr Glu Arg Lys
                        405                 410                 415
        Thr Pro Arg Val Thr Gly Gly Ala Met Ala Gly Ala Ser Thr Ser
                        420                 425                 430
        Ala Gly Arg Lys Arg Lys Ser Ala Ser Ser Ala Thr Ala Cys Thr Ser
                        435                 440                 445
        Gly Val Met Thr Arg Gly Arg Leu Lys Ala Glu Ser Thr Val Ala Pro
                    450                 455                 460
        Glu Glu Asp Thr Asp Glu Asp Ser Asp Asn Glu Ile His Asn Pro Ala
        465                 470                 475                 480
        Val Phe Thr Trp Pro Pro Trp Gln Ala Gly Ile Leu Ala Arg Asn Leu
                        485                 490                 495
        Val Pro Met Val Ala Thr Val Gln Gly Gln Asn Leu Lys Tyr Gln Glu
                        500                 505                 510
        Phe Phe Trp Asp Ala Asn Asp Ile Tyr Arg Ile Phe Ala Glu Leu Glu
                    515                 520                 525
        Gly Val Trp Gln Pro Ala Ala Gln Pro Lys Arg Arg Arg His Arg Gln
                    530                 535                 540
        Asp Ala Leu Pro Gly Pro Cys Ile Ala Ser Thr Pro Lys Lys His Arg
        545                 550                 555                 560

Gly
```

```
<210> SEQ ID NO 13
<211> LENGTH: 15
<212> TYPE: PRT
<213> ORGANISM: Artificial Sequence
<220> FEATURE:
<223> OTHER INFORMATION: Synthetic construct

<400> SEQUENCE: 13

Ile Ile Lys Pro Gly Lys Ile Ser His Ile Met Leu Asp Val Ala
1               5                   10                  15
```

COMPOSITIONS AND METHODS FOR TREATING HIV INFECTION AND REVERSING HIV LATENCY

CROSS-REFERENCE TO RELATED APPLICATIONS

This application claims the priority benefit of U.S. Provisional Application No. 62/867,501, filed Jun. 27, 2019, which is incorporated herein by reference in its entirety.

STATEMENT REGARDING FEDERALLY SPONSORED RESEARCH OR DEVELOPMENT

This invention was made with government support under grant numbers AI035041, AI131763, AI126603 and AI065380 awarded by the National Institutes of Health. The government has certain rights in the invention.

BACKGROUND

Despite the success of antiretroviral therapy (ART), HIV-1 is managed as a chronic disease due to its persistence in a long-lived population of resting memory CD4$^+$ T cells (Ruelas D S, 2013). This latent reservoir of inducible, replication-competent HIV-1 in ART-suppressed individuals is considered a critical barrier to a cure (Bruner K M, 2015), since the lack of viral protein expression in latently infected cells allows the reservoir to escape immune surveillance. The 'kick and kill' (or 'shock and kill') approach to controlling HIV-1 involves inducing HIV-1 latency reversal (LR) during ART to expose infected cells, while creating an arsenal of immune effector cells, such as cytotoxic T lymphocytes (CTL), capable of eliminating these targets (Deeks S G, 2012). Successful CTL targeting of the latent HIV-1 reservoir will require recognition of HIV-1-associated peptide epitopes presented on infected cells after LR. Besides latency itself, major hurdles for effective CTL elimination of HIV-1 infected cells include issues related to CD8$^+$ T cell exhaustion (Jones R B, 2016), alterations in CTL epitopes, antigen processing, and antigen presentation associated with immune escape (Goulder P J, 2004; Boucau J, 2018); the establishment of epitope variants that act as partial agonists to induce dysfunctional noncytolytic cross-reactive memory CTL responses (Mailliard R B, 2013; Smith K N, 2016), and presentation of target antigen decoys by cells harboring defective virus (Pollack R A; 2017). Together, these points highlight the need to generate highly functional CTL either through induction of de novo CD8$^+$ T cell responses, or subdominant memory responses targeting relevant conserved epitopes of the reservoir-associated virus.

Finding an effective means to expose and purge the latent reservoir in a nontoxic manner has been elusive and remains a major hurdle to this cure approach. While pharmacological latency reversal agents (LRAs) have achieved limited success in ex vivo studies, none have been shown to reduce the latent reservoir in HIV-1-infected individuals (Bullen C K, 2014). Although the protein kinase C (PKC) agonist bryostatin-1 was shown to achieve T cell activation comparable to that induced by PHA/II-2 stimulation in vitro and ex vivo (Bullen C K, 2014; Clutton G, 2016), its use in cancer clinical trials resulted in serious adverse events (Lam A P, 2010; Smith B D, 2011; Morgan R J, Jr., 2012; Ajani J A, 2006). Furthermore, in a phase I HIV-1 clinical trial, tolerable but conservative drug dosing of bryostatin-1 prevented it from reaching detectable systemic concentrations associated with PKC activation and from reactivating latent HIV-1 reservoirs (Gutierrez C, 2016).

Some LRAs, specifically histone deacetylase inhibitors and PKC modulators, can negatively impacting antigen-specific CD8$^+$ T cell effector responses in vitro (Clutton G, 2016; Jones R B, 2014; Zhao M, 2019). However, it is unclear if this negative effect on HIV-1-specific immunity occurs with their use in vivo. More promising data, have emerged from studies utilizing TLR agonists as LRAs, including those targeting TLR7 (Tsai A, 2017; Borducchi E N, 2016; Borducchi E N, 2018; Vibholm L, 2017). This strategy to target such germline-encoded innate immune activation receptors effectively contributes to impacting the latent reservoir and delaying viral rebound In nonhuman primate models, particularly when combined either with therapeutic vaccination using Ad26/MVA (recombinant adenovirus serotype 26 prime/modified vaccinia Ankara boost) expressing gag, pol and env (Borducchi E N, 2016), or with HIV-broadly neutralizing antibody (bNAb) therapy (Borducchi E N, 2018). While promising, the potential for toxicity associated with TLR-induced broad activation of innate immune cells exists. Thus, what is needed are eradication strategies to reverse HIV latency without inducing nonspecific global immune activation, while enhancing HIV antigen-specific adaptive immunity.

Other studies have explored the LRA potential of immature DC using in vitro models of HIV-1 latency with infected immortalized cell lines, through in vitro establishment of HIV-1 latency in primary CD4$^+$ T cells of uninfected donors, or by addressing their nonspecific impact on in vitro pre-expanded polyclonal-activated T cells. However, these studies did not make use of mature, type 1 polarized monocyte derived dendritic cells myeloid derived dendritic cells (MDC) or MDC that were specifically matured to induce differentially polarized immune responses. Nor did these studies teach the use of the dendritic cells to induce HIV latency reversal in an antigen-directed or antigen-specific or fashion.

SUMMARY

The compositions and methods disclosed herein address certain unmet needs in HIV therapy. In some aspects, disclosed herein is a composition and uses thereof for treating HIV infection, wherein the composition comprises one or more mature monocyte-derived dendritic cells (MDCs) having an HIV peptide bound to a Class I major histocompatibility complex (MHC) molecule and a herpesvirus peptide bound to one or more Class II MHC molecules. The compositions and methods disclosed herein result in surprisingly effective reversal of latency in HIV infected CD4$^+$ T cells. Using MDCs comprising CMV peptides bound to their Class II MHC molecule surprisingly enables the latency reversal in the HIV infected CD4$^+$ T cells without inducing non-specific global immune activation. Further, in some embodiments, the MDCs comprising viral peptides of HIV or CMV bound to their Class I MHC molecules enhance HIV-specific CD8$^+$ cytotoxic T cell immune activation, resulting in a more effective killing of the CD4$^+$ T cells undergoing latency reversal.

In some aspects, disclosed herein is a method of treating a human immunodeficiency virus-1 (HIV-1) infection in a subject, comprising obtaining one or more mature monocyte-derived dendritic cells (MDCs) having an HIV-1 peptide bound to a Class I major histocompatibility complex (MHC) molecule and a herpesvirus peptide bound to one or more Class II MHC molecules; and administering to the subject an effective amount of the one or more MDCs.

In some aspects, disclosed herein is a method of treating an HIV-1 infection in a subject, comprising administering to the subject an effective amount of one or more mature monocyte-derived dendritic cells (MDC) s, one or more HIV-1 proteins or fragments thereof, and one or more herpesvirus proteins or fragments thereof.

In some embodiments, a first of the one or more MDCs has the herpesvirus peptide bound to the Class II MHC molecule and a second of the one or more MDCs has the HIV-1 peptide bound to the Class I MHC molecule. In some embodiments, the first MDC is administered to the subject before the second MDC. In some embodiments, the first MDC is administered to the subject concurrently with the second MDC.

In some embodiments, the HIV-1 peptide is selected from the group consisting of an HIV Gag peptide, an HIV Pol peptide, an HIV Env peptide, an HIV Vif peptide, an HIV Vpr peptide, an HIV Tat peptide, an HIV Vpu peptide, and an HIV Nef peptide. In some embodiments, the HIV-1 peptide is selected from the group consisting of a Gag p24 peptide, a Gag p17 peptide, a Gag p7 peptide, and a Gag p6 peptide. In some embodiments, the HIV-1 peptide comprises an amino acid sequence set forth in SEQ ID NO:1, SEQ ID NO:2, SEQ ID NO: 3, SEQ ID NO:4, SEQ ID NO:5, SEQ ID NO:6, SEQ ID NO:7 or SEQ ID NO:8. In some embodiments, the herpesvirus peptide is a CMV peptide. In some embodiments, the CMV peptide is a CMV pp65 peptide. In some embodiments, the one or more MDCs are derived from the subject (e.g., a human).

In some aspects, disclosed herein is a method of reversing HIV-1 latency in a CD4$^+$ T cell in a subject, comprising obtaining one or more mature monocyte-derived dendritic cells (MDCs) having a herpesvirus peptide bound to one or more Class II MHC molecules; and administering to the subject an effective amount of the one or more MDCs.

Also included herein are methods of detecting HIV-1 latency reversal in a CD4$^+$ T cell comprising culturing an HIV-1 latent infected CD4$^+$ T cell with one or more mature monocyte-derived dendritic cells (MDCs) having an HIV-1 peptide bound to a Class I major histocompatibility complex (MHC) molecule and a herpesvirus peptide bound to a Class II MHC molecule; and identifying within the culture a CD4$^+$ T cell having reduced CD4 expression as compared to a control, wherein the reduction of CD4 cell surface expression indicates HIV-1 latency reversal in the CD4$^+$ T cell. Also included are methods further comprising isolating the CD4$^+$ T cell having reduced CD4 expression using a solid phase separation technique or a fluorescence acquired cell sorting (FACS) technique. In a preferred embodiment, the isolated CD4$^+$ T cell having reduced CD4 expression is a live or viable cell following the isolation procedure.

DETAILED DESCRIPTION

Figure 1A:
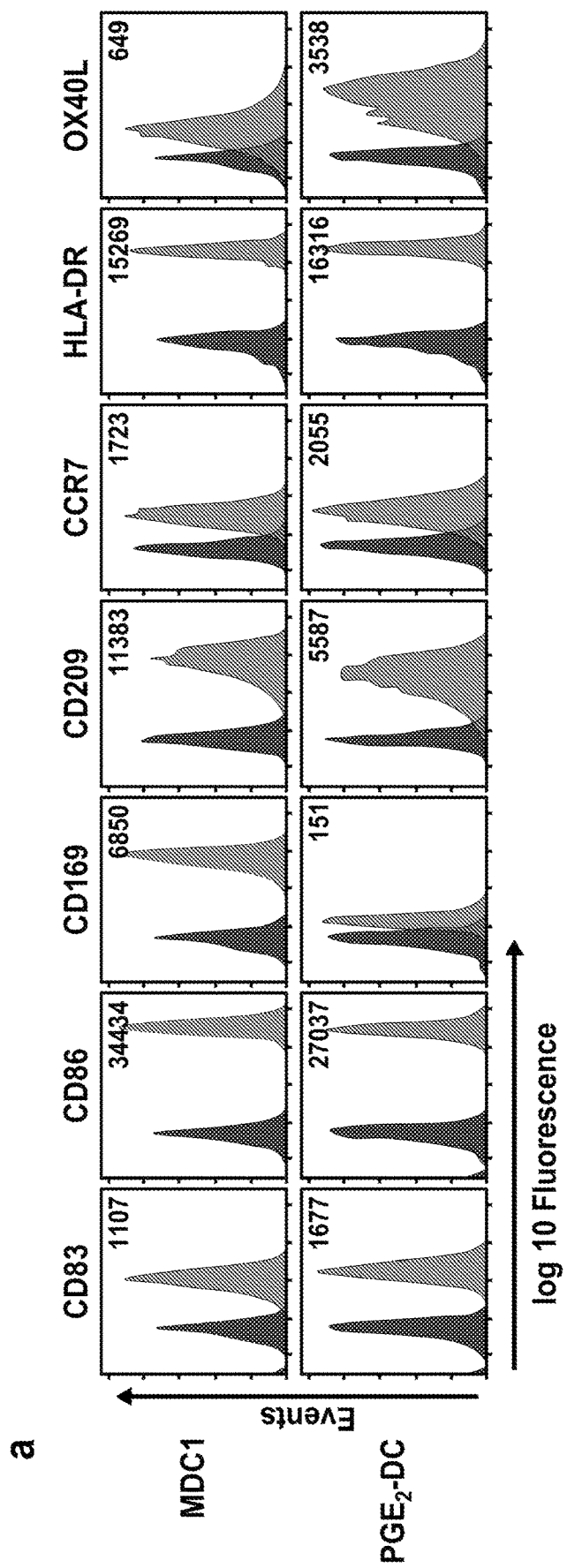
FIG. 1(a-d) shows that MDC1s are superior inducers of HIV-1-specific CTL responses. a) In vitro cultured, differentially type 1 polarized mature monocyte-derived DC (MDC1) were analyzed for surface phenotype. Gray histogram peaks of flow cytometry plots indicate unstained control samples; peaks shaded in blue represent positive staining for the phenotypic markers indicated. Inset numbers refers to MFI. b) Mature DC were tested for their net IL-12p70-producing capacity above background in response to CD40L stimulation. P values were determined by Wilcoxon matched-pairs signed-ranks test. Error bars indicate mean±SEM; n=30. **P<0.0001. c) MDC1 and PGE2-DC loaded with HIV-1 Gag$_{151-159}$ peptide (TLNAWVKVV, SEQ ID NO: 1) were cocultured with autologous CD8$^+$ T cells from HLA-A2+HIV-1-naïve individuals. The in vitro expanded antigen-specific CTLs were quantified by IFN-γ ELISPOT. Shown are values from unstimulated (−) and peptide stimulated (+) CTLs generated using antigen presenting MDC1 or PGE2-DC. P values were calculated using a linear mixed model with 95% confidence intervals. Error bars indicate mean±S.D. P<0.01. d) IFN-γ ELISPOT results of CD8$^+$ T cell responses to Gag$_{151-159}$ peptide variants induced in 3 different HIV-uninfected donors by autologous antigen-presenting MDC1 in the absence or presence of CD40L.

Disclosed herein are methods for treating HIV-1 infection by administering an effective amount of one or more in vitro cultured, mature monocyte-derived dendritic cells (MDCs) having virus peptides bound to more than one major histocompatibility complex (MHC) molecule on the MDCs, wherein the virus peptides comprise HIV-1 peptides and herpesvirus peptides. This method has been shown to be surprisingly effective at both reversing HIV-1 latency in CD4+ T cells and activating CD8+ cytotoxic effector T cells (CTLs) against the HIV-1 latency reversed CD4+ T cells. This MDC1-based approach of promoting both "kick" (latency reversal in CD4+ T cells) and "kill" (activating CTL killing) is a novel approach for treating HIV-1 infection.

Terms used throughout this application are to be construed with ordinary and typical meaning to those of ordinary skill in the art. However, Applicants desire that the following terms be given the particular definition as provided below.

Terminology

As used in the specification and claims, the singular form "a," "an," and "the" include plural references unless the context clearly dictates otherwise. For example, the term "a cell" includes a plurality of cells, including mixtures thereof, and "a Class I MHC" and "a Class II MHC" includes a plurality of MHC, including mixtures thereof. In some instances "one or more" is used herein to specifically describe different characteristics of a plurality. Even when "one or more" is used instead of or along with "a", "a" continues to include a plurality with different characteristics or a mixture.

The term "about" as used herein when referring to a measurable value such as an amount, a percentage, and the like, is meant to encompass variations of ±20%, ±10%, ±5%, or ±1% from the measurable value.

"Administration" to a subject or "administering" includes any route of introducing or delivering to a subject an agent. Administration can be carried out by any suitable route, including intravenous, intraperitoneal, and the like. Administration includes self-administration and the administration by another.

The term "biological sample" as used herein means a sample of biological tissue or fluid. Such samples include, but are not limited to, tissue isolated from animals. Biological samples can also include sections of tissues such as biopsy and autopsy samples, frozen sections taken for histologic purposes, blood, plasma, serum, sputum, stool, tears, mucus, hair, and skin. Biological samples also include explants and primary and/or transformed cell cultures derived from patient tissues. A biological sample can be provided by removing a sample of cells from an animal, but can also be accomplished by using previously isolated cells (e.g., isolated by another person, at another time, and/or for another purpose), or by performing the methods as disclosed herein in vivo. Archival tissues, such as those having treatment or outcome history can also be used.

"CD4+ T cell" used herein refers to a type of lymphocyte that expresses cell surface T cell receptors for recognizing peptides presented on MHC class II molecules and expresses CD4 on its surface. In some embodiments, the CD4+ T cell expresses a low level of CD4 (i.e., CD4$^{low}$). A CD4+ T cell having a reduced amount of CD4 cell surface expression as compared to a control can be referred to as CD4$^{low}$.

"Herpesvirus" is used herein to refer to a member of the Herpesviridae family of double-stranded DNA viruses, which cause latent or lytic infections. Herpesviruses all share a common structure: all herpesviruses are composed of relatively large double-stranded, linear DNA genomes encoding 100-200 genes encased within an icosahedral protein cage called the capsid which is itself wrapped in a protein layer called the tegument containing both viral proteins and viral mRNAs and a lipid bilayer membrane called the envelope. Herpesviruses are divided into three subfamilies: alphaherpesvirinae, betaherpesvirinae, and gammaherpesvirinae. Eight herpesviruses routinely infect only humans: herpes simplex virus types 1 and 2, varicella-zoster virus, cytomegalovirus (CMV), Epstein-Barr virus, human herpesvirus 6 (variants A and B), human herpesvirus 7, and Kaposi's sarcoma virus or human herpesvirus 8. A simian virus, called B virus, occasionally infects humans.

As used herein, the term "CMV" refers to cytomegalovirus, which is in the family Herpesviridae and the subfamily Betaherpesvirinae. HHV-5 is a CMV species that infects humans.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

"Dendritic cell" or "DC", as used herein, refers to a mature antigen presenting cell, which is typically identified by the expression of one or more of the following markers on its cell surface: CD1a, CD1b, and CD1c, CD4, CD11c, CD33, CD40, CD80, CD86, CD83 and HLA-DR. "Mature monocyte-derived dendritic cell" and "MDC" as used herein refer to a mature dendritic cell differentiated from a monocyte that has the following expression profile: CD14$^{neg}$, MHC$^{hi}$, CD86$^{+}$, and CD83$^{+}$. "MDC" includes MDC1s and non-MDC1s such as those cells matured with Prostaglandin E2 (PGE2).

"Effective amount" encompasses, without limitation, an amount that can ameliorate, reverse, mitigate, prevent, or diagnose a symptom or sign of a medical condition or disorder (e.g., HIV-1 infection). Unless dictated otherwise, explicitly or by context, an "effective amount" is not limited to a minimal amount sufficient to ameliorate a condition. The severity of a disease or disorder, as well as the ability of a treatment to prevent, treat, or mitigate, the disease or disorder can be measured, without implying any limitation, by a biomarker or by a clinical parameter. The "effective amount of MDC" refers to an amount of MDC sufficient to cause some HIV-1 latency reversal in a CD4+ T cell and to increase CTL killing of that CD4+ T cell.

The "fragments," whether attached to other sequences or not, can include insertions, deletions, substitutions, or other selected modifications of particular regions or specific amino acids residues, provided the activity of the fragment is not significantly altered or impaired compared to the nonmodified peptide or protein. These modifications can provide for some additional property, such as to remove or add amino acids capable of disulfide bonding, to increase its bio-longevity, to alter its secretory characteristics, etc. In any case, the fragment must possess a bioactive property, such as presentation by MHC molecules for activating CD4+ T cells or CD8+ T cells.

As used herein, the term "HIV-1" refers to the human immunodeficiency virus-1, a retrovirus that infects CD4+ T cells and causes acquired immunodeficiency syndrome (AIDS). The HIV-1 can be a group M, group N, group O, or group P type. The HIV-1 group M type can be a subtype A, subtype B, subtype C, subtype D, subtype E, subtype F, subtype G, subtype H, subtype I, subtype J or subtype K.

The term "isolating" as used herein refers to isolation from a biological sample, i.e., blood, plasma, tissues, exosomes, or cells. As used herein the term "isolated," when used in the context of, e.g., a HIV-1 infected latency reversed CD4+ T cell, refers to a HIV-1 infected latency reversed CD4+ T cell of interest that is at least 60% free, at least 75% free, at least 90% free, at least 95% free, at least 98% free, or at least 99% free from other components with which the HIV-1 infected latency reversed CD4+ T cell is associated in a blood, plasma or tissue sample.

Herein, "MHC" refers to the major histocompatibility complex cell surface proteins that bind to, or present, antigens for recognition by T cells. MHC molecules are divided into two classes, MHC class I and MHC class II, based on the structure of the molecule. MHC class I molecules consist of an alpha chain which folds into 3 alpha domains (a1, a2, and a3) and is stabilized by the presence of b2-microglobulin. MHC class I molecules can be encoded by multiple genes: A, B, C, E, F, G, H, J, and X. When MHC class I molecules present antigen, the antigen is presented in the binding cleft between the a1 and a2 domains as a peptide typically 8 to 10 amino acids long. The length of the peptide is restricted by the closed ends of the binding cleft. Typically, MHC class I molecules present peptide antigens to CD8+ T cells.

MHC class II molecules consist as a dimeric molecule with an alpha chain and a beta chain. Both the alpha chain and the beta chain have two domains. Thus the alpha chain has an a1 and a2 domain and the beta chain has a b1 and b2 domain. MHC class II molecules can be encoded by multiple genes: DP, DM, DQ, and DR. For MHC class II molecules, antigen is typically presented between the a1 and b1 domains. Because the peptide binding cleft is formed by two separate chains, the peptide bound by the MHC class II molecule is not restricted by length though T-cells usually only recognize that portion of the peptide presented within the binding cleft. The peptide presented in the context of MHC class II molecules is typically recognized by CD4+ T-cells.

The term "peptide" is used in its broadest sense to refer to a compound of two or more subunit amino acids, amino acid analogs, or peptidomimetics. The subunits may be linked by peptide bonds. In another embodiment, the subunits may be linked by other bonds, e.g. ester, ether, etc. As used herein the term "amino acid" refers to either natural and/or unnatural or synthetic amino acids, including glycine and both the D or L optical isomers, and amino acid analogs and peptidomimetics. In some embodiments, the peptide is 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, or 20 amino acids.

The term "subject" is defined herein to include animals such as mammals, including, but not limited to, primates (e.g., humans), cows, sheep, goats, horses, dogs, cats, rabbits, rats, mice and the like. In some embodiments, the subject is a human.

The terms "treat," "treating," "treatment," and grammatical variations thereof as used herein, include alleviating, mitigating or reducing the intensity of one or more attendant symptoms of a disorder or condition and/or alleviating, mitigating or impeding one or more causes of a disorder or condition. Treatments according to the invention may be applied preventively, prophylactically, pallatively or remedially. Prophylactic treatments are administered to a subject prior to onset (e.g., before obvious signs of HIV-1 latency, during early onset (e.g., upon initial signs and symptoms of HIV-1 latency), or after an established development of HIV-1 latency. Prophylactic administration can occur for several days to years prior to the manifestation of symptoms of an infection.

In some instances, the terms "treat", "treating", "treatment" and grammatical variations thereof, include reducing the amount of HIV-1 infected CD4$^+$ T cells, the amount of CD4$^+$ T cells harboring replication-competent provirus, and/or the levels of viremia in a subject as compared with prior to treatment of the subject or as compared with the incidence of such symptom in a general or study population.

Methods of Treating HIV-1 Infection

Disclosed herein are methods for treating HIV-1 infection by administering an effective amount of one or more mature monocyte-derived dendritic cells (MDCs) having different peptides bound to Class I and Class II major histocompatibility complex (MHC) molecules. It has been shown herein that antigen-presenting MDCs are capable of inducing both HIV-1 latency reversal in infected CD4$^+$ T cells isolated from ART-treated HIV-1$^+$ Multicenter AIDS Cohort Study (MACS) participants, and HIV-1 antigen-specific CTL responses that can effectively kill the MDC-exposed HIV-1-infected targets. Accordingly, the present disclosure shows, in a natural setting of chronic HIV-1 infection, the use of an effective, clinically relevant autologous mature DC type specifically programmed to both mediate latency reversal in isolated CD4$^+$ T cells derived from individuals undergoing successful ART (antiretroviral therapy), and to induce effector cells capable of recognizing and eliminating the infected cells.

Therefore, in some embodiments, disclosed herein is a method of treating a subject infected by an HIV-1, comprising: obtaining one or more MDCs having an HIV-1 peptide bound to a Class I major histocompatibility complex (MHC) molecule and a herpesvirus peptide bound to a Class II MHC molecule and administering to the subject an effective amount of the one or more MDCs. In some embodiments, disclosed herein is a method of treating an HIV-1 infection in a subject, comprising administering to the subject an effective amount of one or more mature monocyte-derived dendritic cells (MDC) s, one or more HIV-1 proteins or fragments thereof, and one or more herpesvirus proteins or fragments thereof.

Included herein are methods of treating an HIV-infection in a subject who has previously had antiretroviral therapy. The antiretroviral therapy can comprise one or more of a nucleoside/nucleotide reverse transcriptase inhibitor (NRTI), a non-nucleoside reverse transcriptase inhibitor (NNRTI), a protease inhibitor (PI), an integrase inhibitor, a fusion inhibitor, a CCR5 antagonist, a post-attachment inhibitor or monoclonal antibody therapy, and a pharmacologic enhancer such as Ritonavir. Accordingly, in some embodiments, the antiretroviral therapy is one or more of Abacavir, or ABC (ZIAGEN®), Didanosine, or ddI (VIDEX®), Emtricitabine, or FTC (EMTRIVA®), Lamivudine, or 3TC (EPIVIR®), Stavudine, or d4T (ZERIT®), Tenofovir alafenamide, or TAF (VEMLIDY®), Tenofovir disoproxil fumarate, or TDF (VIREAD®), and Zidovudine or ZDV (RETROVIR®). In some embodiments, the antiretroviral therapy is one or more of Delavirdine or DLV (RESCRIPTOR®), Doravirine, or DOR (PIFELTRO®), Efavirenz or EFV (SUSTIVA®), Etravirine or ETR (INTELENCE®), Nevirapine or NVP (VIRAMUNE®), and Rilpivirine or RPV (EDURANT®). In some embodiments, the antiretroviral therapy is one or more of Atazanavir or ATV (REYATAZ®), Darunavir or DRV (PREZISTAR), Fosamprenavir or FPV (LEXIVAR), Indinavir or IDV (CRIXIVAN®), Lopinavir+ritonavir, or LPV/r (KALETRA®), Nelfinavir or NFV (VIRACEPT®), Ritonavir or RTV (NORVIR®), Saquinavir or SQV (INVIRASE®, FORTOVASE™) and Tipranavir or TPV (APTIVUS®). In some embodiments, the antiretroviral is one or more of Bictegravir or BIC (combined with other drugs as BIKTARVY®), Dolutegravir or DTG (TIVICAY®), Elvitegravir or EVG (VITEKTA™), and Raltegravir or RAL (ISENTRESS®). In some embodiments, the antiretroviral is Enfuvirtide, or ENF or T-20 (FUZEON®). In some embodiments, the antiretroviral is Maraviroc, or MVC (SELZENTRY®). In some embodiments, the antiretroviral is Ibalizumab-uiyk (TROGARZO®).

The MDCs are mature dendritic cells differentiated from monocytes that are CD14$^{neg}$MHC$^{hi}$CD86$^+$CD83$^+$. In some embodiments, the immature dendritic cells are differentiated from monocytes by culturing the monocytes with one or more activation factors and one or more maturation factors. In some embodiments, the one or more activation factors are selected from the group consisting of interferon (IFN)-$\alpha$, IL-1$\beta$, tumor necrosis factor (TNF)-$\alpha$, IL-6, and a pattern recognition receptor (PRR) agonist; wherein the PRR agonist comprises a Toll-like-receptor (TLR) agonist (e.g., a TLR1 agonist, a TLR2 agonist, a TLR3 agonist, a TLR4 agonist, a TLR5 agonist, a TLR6 agonist, a TLR7 agonist, a TLR8 agonist, a TLR9 agonist, a TLR10 agonist, a TLR11 agonist, or a TLR12 agonist). In some embodiments, the TLR3 agonist is polyinosinic:polycytidylic acid. In some embodiments, the one or more maturation factors are selected from the group consisting of IFN-$\gamma$ and Prostaglandin E2 (PGE2). In some embodiments, the maturation factor is IFN-$\gamma$. In some embodiments, the maturation factor is Prostaglandin E2 (PGE2).

For example, monocytes can be cultured in culture media, granulocyte macrophage colony stimulating factor, and IL-4 for about 4 days, about 5 days, about 6 days, about 7 days, about 8 days, about 9 days, about 10 days, about 11 days, about 12 days, about 13 days, about 14 days, or about 15 days. CD14 is a marker expressed on myeloid cells (e.g., monocytes or macrophages) but down-regulated once the myeloid cells differentiate to immature DCs. To become mature monocyte-derived dendritic cells (MDC), the immature monocyte-derived dendritic cells are exposed to one or more activation factors and one or more maturation factors for about 12 hours, about 18 hours, about 24 hours, about 30 hours, about 36 hours, about 42 hours, about 48 hours, about 52 hours, about 60 hours, or about 66 hours. In some embodiments, the immature dendritic cells are exposed to the one or more activation factors and the one or more maturation factors for about 48 hours. The one or more activation factors and the one or more maturation factors are introduced to the dendritic cells while immature. In some embodiments, the one or more activation factors and one or more maturation factors are introduced to the immature dendritic cells after culturing the monocytes in culture media, granulocyte macrophage colony stimulating factor, and IL-4 for about 4 days, about 5 days, about 6 days, about 7 days, about 8 days, about 9 days, about 10 days, about 11 days, about 12 days, about 13 days, about 14 days, or about 15 days. In some embodiments, the IFN-α is added at a concentration of about 1000 U/mL. In some embodiments, the IFN-γ is added at a concentration of about 1000 U/mL. In some embodiments, the IL-1β is added at a concentration of about 10 ng/mL. In some embodiments, the TNF-α is added at a concentration of about 25 ng/mL. In some embodiments, the polyinosinic:polycytidylic acid is added at a concentration of about 20 ng/mL. In some embodiments, the PEG2 is added at a concentration of about 2 μM.

In some embodiments, the MDCs produce an increased amount of IL-12p70 as compared to a control DC; wherein the control DC and the MDC are obtained from the same subject around the same time and/or wherein the control DC is not an MDC. In some embodiments, the MDC produces at least about 3- to 10-fold higher amounts of IL-12p70 compared to the control DC. In some embodiments, the MDC produces increased amounts of IL-12p70 upon CD40L mediated stimulation. In some embodiments, the MDC produces increased amounts of IL-12p70 without CD40L mediated stimulation.

The MDCs described herein are used to treat an HIV-1 infection. The HIV-1 can be of any type including a group M HIV-1, a group N HIV-1, a group O HIV-1, and a group P HIV-1. The HIV-1 can also be of a particular M group subtype such as subtype A, subtype B, subtype C, subtype D, subtype E, subtype F, subtype G, subtype H, subtype I, subtype J, or subtype K. Accordingly, in some embodiments, the HIV-1 can be a HIV-1 group M subtype A, HIV-1 group M subtype B, HIV-1 group M subtype C, HIV-1 group M subtype D, HIV-1 group M subtype E, HIV-1 group M subtype F, HIV-1 group M subtype G, HIV-1 group M subtype H, HIV-1 group M subtype I, HIV-1 group M subtype J, or HIV-1 group M subtype K.

Treatment of an HIV-1 infection is achieved by using the MDC1s to increase HIV-1 latency reversal in CD4$^+$ T cells and also to increase CTL killing of those CD4$^+$ T cells in which latency has been reversed. It should be understood that "latency reversal" and the like refers herein to increased presentation of MHC-associated HIV-1 antigen. Latency reversal can be detected by increased HIV-1 viremia. The MDCs that reverse HIV-1 latency can be the same or different than the MDCs that activate CTLs to increase killing of the CD4$^+$ T cells in which HIV-1 latency has been reversed. Accordingly, the present disclosure includes the administration of one type of MDC and the administration of more than one type of MDC. In those embodiments where two different MDCs are administered to the subject, the MDC that are used to reverse HIV-1 latency have a herpesvirus peptide bound to a Class II MHC molecule. In these embodiments, the different, or second, MDC used to activate or increase CTL killing of the reversed HIV-1 latency CD4$^+$ T cells have an HIV-1 peptide bound to a Class I MHC molecule. The MDC having a herpesvirus peptide bound to a Class II MHC molecule and the MDC1 having an HIV-1 peptide bound to a Class I MHC molecule can be administered simultaneously, or the MDC having a herpesvirus peptide bound to a Class II MHC molecule can be administered prior to the MDC having an HIV-1 peptide bound to a Class I MHC molecule. In other embodiments, the MDC administered to the subject has a herpesvirus peptide bound to a Class II MHC molecule and an HIV-1 peptide bound to a Class I MHC molecule.

It should be understood that the present invention encompasses MDCs having more than one HIV-1 peptide bound to more than one Class I MHC, and more than one herpesvirus peptide bound to more than one Class II MHC.

As described above, the peptide presented by an MHC Class I molecule is typically 8 to 10 amino acids long. Accordingly, in some embodiments, the one or more HIV-1 peptides bound by an MHC Class I molecule are 5 amino acids, 6 amino acids, 7 amino acids, 8 amino acids, 9 amino acids, 10 amino acids, 11 amino acids, 12 amino acids long, 13 amino acids, 14 amino acids, or 15 amino acids. The peptide presented by a Class II MHC molecule is not restricted by length as discussed above. Accordingly, in some embodiments, the CMV peptide and/or the SEB peptide bound by a Class II MHC molecule on the MDC1 is 6 amino acids, 7 amino acids, 8 amino acids, 9 amino acids, 10 amino acids, 11 amino acids, 12 amino acids, 13 amino acids, 14 amino acids, 15 amino acids 16 amino acids, 17 amino acids, 18 amino acids 19 amino acids, or 20 amino acids.

In some embodiments, the HIV-1 peptide is selected from the group consisting of an HIV Gag peptide, an HIV Pol peptide, an HIV Env peptide, an HIV Vif peptide, an HIV Vpr peptide, an HIV Tat peptide, an HIV Vpu peptide, and an HIV Nef peptide. In some embodiments, the HIV-1 peptide is selected from the group consisting of a Gag p24 peptide, a Gag p17 peptide, a Gag p7 peptide, and a Gag p6 peptide. In some embodiments, the HIV-1 peptide comprises an amino acid sequence at least about 70%, about 75%, about 80%, about 85%, about 90%, about 93%, about 95%, about 98%, or about 99% identical to SEQ ID NO:1, SEQ ID NO:2, SEQ ID NO:3, SEQ ID NO:4, SEQ ID NO:5, SEQ ID NO:6, SEQ ID NO:7, or SEQ ID NO:8. In some embodiments, the HIV-1 peptide comprises an amino acid sequence of SEQ ID NO:1, SEQ ID NO:2, SEQ ID NO:3, SEQ ID NO:4, SEQ ID NO:5, SEQ ID NO:6, SEQ ID NO:7, or SEQ ID NO:8. In some embodiments, the HIV-1 peptide has an amino acid sequence of SEQ ID NO:1, SEQ ID NO:2, SEQ ID NO:3, SEQ ID NO:4, SEQ ID NO:5, SEQ ID NO: 6, SEQ ID NO:7, or SEQ ID NO:8. In some embodiments, the HIV-1 peptide comprises a fragment of SEQ ID NO:1, SEQ ID NO:2, SEQ ID NO:3, SEQ ID NO:4, SEQ ID NO:5, SEQ ID NO: 6, SEQ ID NO:7, or SEQ ID NO:8. In some embodiments, the HIV-1 peptide bound by an MHC class I molecule is 5 amino acids, 6 amino acids, 7 amino acids, 8 amino acids, 9 amino acids, 10 amino acids, 11 amino acids, 12 amino acids long, 13 amino acids, 14 amino acids, or 15 amino acids.

The herpesvirus peptide described herein can be a peptide of any type of herpesvirus including, for example, herpes simplex virus types 1 and 2, varicella-zoster virus, cytomegalovirus (CMV), Epstein-Barr virus, human herpesvirus 6 (variants A and B), human herpesvirus 7, simian virus, and Kaposi's sarcoma virus or human herpesvirus 8. In some embodiments, the herpesvirus peptide is a CMV peptide. In some embodiments, the herpesvirus peptide is an Epstein-Barr virus peptide.

The CMV peptide can be, but is not limited to, a CMV pp65 peptide. In some embodiments, the CMV peptide is a fragment of the amino acid sequence set forth in SEQ ID NO: 12, or a fragment of an amino acid sequence having or greater than about 80%, about 85%, about 90%, about 95%, about 98% homology, or about 99% homology with SEQ ID NO:12. As discussed above, the CMV peptide can be 6 amino acids, 7 amino acids, 8 amino acids, 9 amino acids, 10 amino acids, 11 amino acids, 12 amino acids, 13 amino acids, 14 amino acids, 15 amino acids 16 amino acids, 17 amino acids, 18 amino acids 19 amino acids, or 20 amino acids. In some embodiments, the CMV pp65 peptide is a fragment of the amino acid sequence set forth in SEQ ID NO:13, or a fragment of an amino acid sequence having or greater than about 80%, about 85%, about 90%, about 95%, about 98% homology, or about 99% homology with SEQ ID NO: 13.

It should be understood that sources of HIV-1, and CMV proteins and peptides include cell-based expression systems for recombinant virus proteins, purification from natural sources, production in vitro by cell-free translation systems, synthetic methods of generating peptides, and in cell antigen processing.

The MDCs described herein can be administered to the subject via any route including oral, topical, intravenous, subcutaneous, transcutaneous, transdermal, intramuscular, intra-joint, parenteral, intra-arteriole, intradermal, intraventricular, intracranial, intraperitoneal, intralesional, intranasal, rectal, vaginal, by inhalation or via an implanted reservoir. The term "parenteral" includes subcutaneous, intravenous, intramuscular, intra-articular, intra-synovial, intrasternal, intrathecal, intrahepatic, intralesional, and intracranial injections or infusion techniques. In some embodiments, the MDC administration is intravenous. In some embodiments, the first MDC is administered to the subject before the second MDC. For example, the first MDC can be administered to the subject at least 1, 2, 3, 4, 5, 6, 7, 8, 9, 10, 11, 12, 14, 16, 18, 20, 22, 24, 26, 28, 30, 32, 34, 36, 38, 40, 42, 44, 46, 48, 50, 54, 58, 62, 64, 78, 72 hours, or 1, 2, 3, 4, 5, 6, 7, 8, 9, or 10 days before administering the second MDC. In some embodiments, the first MDC is administered to the subject concurrently with the second MDC.

Dosing frequency for MDC, includes, but is not limited to, at least about once every month, once every three weeks, once every two weeks, once a week, twice a week, three times a week, four times a week, five times a week, six times a week, or daily. In some embodiments, the interval between each administration is less than about a week, such as less than about any of 6, 5, 4, 3, 2, or 1 day. In some embodiments, the dosing frequency for MDC includes, but is not limited to, at least once a day, twice a day, three times a day, or four times a day. Administration can also be continuous and adjusted to maintaining a level of the compound within any desired and specified range.

In some embodiments, the one or more MDCs are derived from monocytes obtained from the subject. Subjects include mammals, and in some embodiments, the subject is a human. In some embodiments, the human has a latent HIV-1 infection.

Also included herein are methods of treating a subject infected by an HIV-1, comprising administering an effective amount of one or more MDCs, and one or more HIV-1 proteins or fragments thereof, and one or more CMV proteins or fragments thereof. In these embodiments, the binding of the HIV-1, CMV proteins, or fragments thereof, to the MDC Class I and Class II MHC as described above occurs in vivo, and can include the MDC's uptake, processing and presentation of CMV peptides with Class II MHC and the MDC's uptake, processing and presentation of HIV-1 peptides with Class I MHC. The HIV-1 peptides, and the CMV peptides can any described above or below.

Methods of Reversing HIV-1 Latency

Disclosed herein are methods of reversing HIV-1 latency in a CD4$^+$ T cell in a subject infected by an HIV-1, comprising: obtaining one or more MDCs having a herpesvirus peptide bound to a Class II MHC molecule, and administering to the subject an effective amount of the one or more MDCs.

It should be understood that "latency reversal" and the like refers herein to increased presentation of MHC-associated HIV-1 antigen. Latency reversal can be detected by increased HIV-1 viremia.

The HIV-1 can be of any type including a group M HIV-1, a group N HIV-1, a group O HIV-1, and a group P HIV-1. The HIV-1 can also be of a particular M group subtype such as subtype A, subtype B, subtype C, subtype D, subtype E, subtype F, subtype G, subtype H, subtype I, subtype J, or subtype K. Accordingly, in some embodiments, the HIV-1 can be a HIV-1 group M subtype A, HIV-1 group M subtype B, HIV-1 group M subtype C, HIV-1 group M subtype D, HIV-1 group M subtype E, HIV-1 group M subtype F, HIV-1 group M subtype G, HIV-1 group M subtype H, HIV-1 group M subtype I, HIV-1 group M subtype J, or HIV-1 group M subtype K.

The MDCs can be any of those described above or below. The herpesvirus peptide can be a peptide of any type of herpesvirus including, for example, herpes simplex virus types 1 and 2, varicella-zoster virus, cytomegalovirus (CMV), Epstein-Barr virus, human herpesvirus 6 (variants A and B), human herpesvirus 7, simian virus, and Kaposi's sarcoma virus or human herpesvirus 8. In some embodiments, the herpesvirus peptide is a CMV peptide. In some embodiments, the herpesvirus peptide is an Epstein-Barr virus peptide.

The CMV peptide can be, but is not limited to, a CMV pp65 peptide. In some embodiments, the CMV peptide is a fragment of the amino acid sequence set forth in SEQ ID NO: 12, or a fragment of an amino acid sequence having at or greater than about 80%, about 85%, about 90%, about 95%, about 98% homology, or about 99% homology with SEQ ID NO: 12. As discussed above, the CMV peptide can be 6 amino acids, 7 amino acids, 8 amino acids, 9 amino acids, 10 amino acids, 11 amino acids, 12 amino acids, 13 amino acids, 14 amino acids, 15 amino acids 16 amino acids, 17 amino acids, 18 amino acids 19 amino acids, or 20 amino acids. In some embodiments, the CMV pp65 peptide is a fragment of the amino acid sequence set forth in SEQ ID NO:13, or a fragment of an amino acid sequence having or greater than about 80%, about 85%, about 90%, about 95%, about 98% homology, or about 99% homology with SEQ ID NO:13. These peptides can be made by various methods including cell-based expression systems for recombinant virus proteins, purification from natural sources, production in vitro by cell-free translation systems, synthetic methods of generating peptides, and in cell antigen processing.

The MDCs used for HIV-1 latency reversal can be administered to the subject via any route including oral, topical, intravenous, subcutaneous, transcutaneous, transdermal, intramuscular, intra-joint, parenteral, intra-arteriole, intradermal, intraventricular, intracranial, intraperitoneal, intralesional, intranasal, rectal, vaginal, by inhalation or via an implanted reservoir. The term "parenteral" includes subcutaneous, intravenous, intramuscular, intra-articular, intrasynovial, intrasternal, intrathecal, intrahepatic, intralesional, and intracranial injections or infusion techniques. In some embodiments, the MDC administration is intravenous.

Dosing frequency for the MDC, includes, but is not limited to, at least about once every month, once every three weeks, once every two weeks, once a week, twice a week, three times a week, four times a week, five times a week, six times a week, or daily. In some embodiments, the interval between each administration is less than about a week, such as less than about any of 6, 5, 4, 3, 2, or 1 day. In some embodiments, the dosing frequency for MDC includes, but is not limited to, at least once a day, twice a day, three times a day, or four times a day. Administration can also be continuous and adjusted to maintaining a level of the compound within any desired and specified range.

In some embodiments, the one or more MDCs are derived from monocytes obtained from the subject. Subjects include mammals, and in some embodiments, the subject is a human.

Methods of Detecting HIV-1 Latency Reversal and Methods of Isolating HIV-1 Infected CD4$^+$ T Cells Exhibiting Latency Reversal Also included herein are methods of detecting HIV-1 latency reversal in a CD4$^+$ T cell comprising culturing an HIV-1 latent infected CD4$^+$ T cell with one or more mature monocyte-derived dendritic cells (MDCs) having an HIV-1 peptide and a herpesvirus peptide bound to a Class II MHC molecule; and identifying within the culture a CD4$^+$ T cell having reduced CD4 expression as compared to a control, wherein the reduction of CD4 cell surface expression indicates HIV-1 latency reversal in the CD4$^+$ T cell. It should be understood that as used herein, "latency reversal" refers to at least some latency reversal and does not require a complete latency reversal. Accordingly, these methods identify and isolate CD4$^+$ T cells undergoing latency reversal and CD4$^+$ T cells having undergone latency reversal. The control can be an HIV-1 latent infected CD4$^+$ T cell that is cultured in the absence of one or more mature monocyte-derived dendritic cells (MDCs) having an HIV-1 peptide and a herpesvirus peptide bound to a Class II MHC molecule. In these embodiments, the CD4$^+$ T cell, MDCs, HIV-1 peptide, and herpesvirus peptide can be any of those described herein. Accordingly, the CD4$^+$ T cells and/or the MDCs can be derived from a biological sample of a subject including a peripheral blood mononuclear cell (PBMC) sample or a whole blood sample. In some embodiments, the CD4 cell surface expression is reduced to about 30%, about 40%, about 50%, about 60%, about 70%, about 80%, about 90%, about 97%, or about 100% of a control. In some embodiments, the HIV-1 latency reversed CD4$^+$ T cell is considered a CD4$^{low}$ T cell. In some embodiments, the HIV-1 latency reversed CD4$^+$ T cell is considered a CD4$^{negative}$ T cell. Also included are methods further comprising isolating the CD4$^+$ T cell having reduced CD4 expression using a solid phase separation technique or a fluorescence acquired cell sorting (FACS) technique, which technique separates constituents based on CD4 cell surface expression and/or lack thereof. The solid phase support can be any appropriate solid phase including a silica gel, resin, derivatized plastic film, glass bead, cotton, plastic bead, magnetic bead, and alumina gel. In some embodiments, the solid phase is a magnetic bead. In a preferred embodiment, the isolated CD4$^+$ T cell having reduced CD4 expression is a live or viable cell following the isolation procedure.

MDC Compositions

Included herein are MDC compositions comprising one or more MDCs having an HIV-1 peptide bound to a Class I major histocompatibility complex (MHC) molecule and a herpesvirus peptide bound to a Class II MHC molecule. The compositions can comprise one type of MDC or multiple types of MDCs. The MDCs can be MDC1s or non-MDC1s, e.g., cells matured with PGE2. In some embodiments, the composition comprises one MDC that has the herpesvirus peptide bound to an MHC Class II molecule and the HIV-1 peptide bound to a Class I MHC molecule. In other embodiments, the composition comprises at least two types of MDCs: a first of the MDCs has the herpesvirus peptide bound to a Class II MHC molecule and a second of the MDCs has the HIV-1 peptide bound to a Class I MHC molecule. In some embodiments, the herpesvirus peptide is a CMV peptide. In some embodiments, the CMV peptide is a pp65 peptide.

The MDCs of the compositions are mature dendritic cells differentiated from monocytes that are CD14$^{neg}$MHC$^{hi}$CD86$^+$CD83$^+$. In some embodiments, the immature dendritic cells are differentiated from monocytes by culturing the monocytes with one or more activation factors and one or more maturation factors. In some embodiments, the one or more activation factors are selected from the group consisting of interferon (IFN)-α, IL-1B, IL-6, tumor necrosis factor (TNF)-α, and a pattern recognition receptor (PRR) agonist; wherein the PRR agonist comprises a Toll-like-receptor (TLR) agonist (e.g., a TLR1 agonist, a TLR2 agonist, a TLR3 agonist, a TLR4 agonist, a TLR5 agonist, a TLR6 agonist, a TLR7 agonist, a TLR8 agonist, a TLR9 agonist, a TLR10 agonist, a TLR11 agonist, or a TLR12 agonist). In some embodiments, the TLR3 agonist is polyinosinic:polycytidylic acid. In some embodiments, the one or more maturation factors are selected from the group consisting of IFN-γ and Prostaglandin E2 (PGE2). In some embodiments, the maturation factor is IFN-γ. In some embodiments, the maturation factor is Prostaglandin E2 (PGE2).

For example, monocytes can be cultured in culture media, granulocyte macrophage colony stimulating factor, and IL-4 for about 4 days, about 5 days, about 6 days, about 7 days, about 8 days, about 9 days, about 10 days, about 11 days, about 12 days, about 13 days, about 14 days, or about 15 days. CD14 is a marker expressed on myeloid cells (e.g., monocytes or macrophages) but down-regulated once the myeloid cells differentiate to immature DCs. To become mature monocyte-derived dendritic cells (MDC), the immature monocyte-derived dendritic cells are exposed to one or more activation factors and one or more maturation factors for about 12 hours, about 18 hours, about 24 hours, about 30 hours, about 36 hours, about 42 hours, about 48 hours, about 52 hours, about 60 hours, or about 66 hours. In some embodiments, the immature dendritic cells are exposed to the one or more activation factors and the one or more maturation factors for about 48 hours. The one or more activation factors and the one or more maturation factors are introduced to the dendritic cells while immature. In some embodiments, the one or more activation factors and one or more maturation factors are introduced to the immature dendritic cells after culturing the monocytes in culture media, granulocyte macrophage colony stimulating factor, and IL-4 for about 4 days, about 5 days, about 6 days, about 7 days, about 8 days, about 9 days, about 10 days, about 11 days, about 12 days, about 13 days, about 14 days, or about 15 days. In some embodiments, the IFN-α is added at a concentration of about 1000 U/mL. In some embodiments, the IFN-γ is added at a concentration of about 1000 U/mL. In some embodiments, the IL-1β is added at a concentration of about 10 ng/mL. In some embodiments, the TNF-α is added at a concentration of about 25 ng/mL. In some embodiments, the polyinosinic:polycytidylic acid is added at a concentration of about 20 ng/mL. In some embodiments, the PEG2 is added at a concentration of about 2 μM.

In some embodiments, the MDCs of the compositions produce an increased amount of IL-12p70 as compared to a control DC; wherein the control DC and the MDC are obtained from the same subject around the same time and/or wherein the control DC is not an MDC. In some embodiments, the MDC produces at least about 3- to 10-fold higher amounts of IL-12p70 compared to control DC. In some embodiments, the MDC produces increased amounts of IL-12p70 upon CD40L mediated stimulation. In some embodiments, the MDC produces increased amounts of IL-12p70 without CD40L mediated stimulation.

In some composition embodiments, the HIV-1 peptide is selected from the group consisting of an HIV Gag peptide, an HIV Pol peptide, an HIV Env peptide, an HIV Vif peptide, an HIV Vpr peptide, an HIV Tat peptide, an HIV Vpu peptide, and an HIV Nef peptide. In some embodiments, the HIV-1 peptide is selected from the group consisting of a Gag p24 peptide, a Gag p17 peptide, a Gag p7 peptide, and a Gag p6 peptide. In some embodiments, the HIV-1 peptide comprises an amino acid sequence at least about 70%, about 75%, about 80%, about 85%, about 90%, about 93%, about 95%, about 98%, or about 99% identical to SEQ ID NO:1, SEQ ID NO:2, SEQ ID NO:3, SEQ ID NO:4, SEQ ID NO:5, SEQ ID NO:6, SEQ ID NO:7, or SEQ ID NO:8. In some embodiments, the HIV-1 peptide comprises an amino acid sequence of SEQ ID NO:1, SEQ ID NO:2, SEQ ID NO:3, SEQ ID NO:4, SEQ ID NO:5, SEQ ID NO:6, SEQ ID NO:7, or SEQ ID NO:8, of a fragment thereof. In some embodiments, the HIV-1 peptide has an amino acid sequence of SEQ ID NO:1, SEQ ID NO:2, SEQ ID NO:3, SEQ ID NO: 4, SEQ ID NO:5, SEQ ID NO:6, SEQ ID NO:7, or SEQ ID NO:8.

It should be understood that the herpesvirus peptide described herein, can be a peptide of any type of herpesvirus that infects human, including, for example, herpes simplex virus types 1 and 2, varicella-zoster virus, cytomegalovirus (CMV), Epstein-Barr virus, human herpesvirus 6 (variants A and B), human herpesvirus 7, simian virus, and Kaposi's sarcoma virus or human herpesvirus 8. In some embodiments, the herpesvirus peptide is a CMV peptide. In some embodiments, the herpesvirus peptide is an Epstein-Barr virus peptide. The CMV peptide can be, but is not limited to, a CMV pp65 peptide.

In some embodiments, the CMV peptide is a fragment of the amino acid sequence set forth in SEQ ID NO:12, or a fragment of an amino acid sequence having or greater than about 80%, about 85%, about 90%, about 95%, about 98% homology, or about 99% homology with SEQ ID NO:12. As discussed above, the CMV peptide can be 6 amino acids, 7 amino acids, 8 amino acids, 9 amino acids, 10 amino acids, 11 amino acids, 12 amino acids, 13 amino acids, 14 amino acids, 15 amino acids 16 amino acids, 17 amino acids, 18 amino acids 19 amino acids, or 20 amino acids. In some embodiments, the CMV pp65 peptide is a fragment of the amino acid sequence set forth in SEQ ID NO:13, or a fragment of an amino acid sequence having or greater than about 80%, about 85%, about 90%, about 95%, about 98% homology, or about 99% homology with SEQ ID NO:13.

It should be understood that sources of HIV-1 and CMV proteins and peptides include cell-based expression systems for recombinant virus proteins, purification from natural sources, production in vitro by cell-free translation systems, synthetic methods of generating peptides, and in cell antigen processing.

EXAMPLES

The following examples are set forth below to illustrate the compositions, methods, and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Example 1: Methods and Materials

Study participants. HIV-1-infected ART-treated participants of the Pittsburgh clinical site of the Multicenter AIDS Cohort Study (MACS) were selected for this research. These participants were documented as having begun ART with a median virally controlled treatment duration of 12.3 years (range 1.7-20.8 years). Whole blood products from HIV-1-negative blood donors were purchased from the Central Blood Bank of Pittsburgh. Written informed consent was obtained from participants prior to inclusion in the study. The University of Pittsburgh Institutional Review Board approved this study.

Isolation of monocytes and peripheral blood lymphocytes. Peripheral blood mononuclear cells (PBMC) obtained from buffy coat or whole blood were isolated by standard density gradient separation using Lymphocyte Separation Medium (Corning Cat #25-072-CV). PBMC were further separated into monocytes and peripheral blood lymphocytes (PBL) using a positive selection human CD14 microbeads kit (Miltenyi Biotec Cat #130-05-201; RRID: AB_2665482) according to manufacturer's specifications, and the differentially isolated cells were cryopreserved until use.

Generation of monocyte-derived DC. Immature DC were generated from monocytes isolated and cultured for 7 days in Iscove's Modified Dulbecco's Media (IMDM; Gibco Cat #12440-053) containing 10% fetal bovine serum Atlanta biologicals Cat #S12450H) and 0.5% gentamicin (Gibco Cat #15710-064) in the presence of granulocyte-monocyte colony-stimulating factor (GM-CSF; 1000 IU/mL; Sanofi-aventis Cat #NAC2004-5843-01) and interleukin-4 (IL-4; 1000 IU/mL; R&D Systems Cat #204-1L). Mature, high IL-12p70-producing MDC1 and IL-12p70 deficient, prostaglandin E2-treated DC (PGE2-DC) were generated as previously described (29) by exposure of immature DC cultures at day 5 for 48 hours to a cocktail of maturation factors containing either interferon (IFN)-α (1000 U/mL; Schering Corporation Cat #NDC: 0085-1110-01), IFN-γ (1000 U/mL; R&D Systems Cat #285-1F), IL-1β (10 ng/ml; R&D Systems #201-LB), tumor necrosis factor (TNF)-α (25 ng/ml; R&D Systems Cat #210-TA), and polyinosinic:polycytidylic acid (20 ng/ml; Sigma-Aldrich Cat #P9582-5 MG), or IL-1β (10 ng/mL), TNF-α (25 ng/ml), IL-6 (1000 U/mL; R&D Systems Cat #206-1L), and PGE2 (2 μM; Sigma-Aldrich Cat #P6532-1 MG), respectively. Both PGE2-DC and MDC1 are MDCs, despite the different cocktails used for activation and maturation.

Flow cytometry. Phenotypic characterization of DC was determined by flow cytometry using cells stained with the following antibodies: CD14-PE (clone TÜK4; Miltenyi Biotec Cat #130-098-067; RRID: AB_2660171), CD83-PE (clone HB15A; Beckman Coulter Cat #IM2218U), CD86-PE (clone HA5.2B7; Beckman Coulter Cat #IM2729U), CCR7-FITC (clone 150503; R&D Systems Cat #FAB197F; RRID: AB_2259847), OX40L-PE (clone ik-1; BD Biosciences Cat #558164; RRID: AB_647195), Siglec-1/CD169-Alexa Fluor® 488 (clone 7-239; Bio-Rad Cat #MCA2517A488T; RRID: 2286027), CD209-APC (clone DCN46; BD Biosciences Cat #551545; RRID: AB_647161), and HLA-DR-APC-Cy7 (clone L243; Biolegend Cat

307618). For surface staining, cells were preincubated with 1×PBS labeling buffer containing 2% BSA, 0.1% NaN3, and unfractionated murine IgG (1.0 µg/mL; Sigma-Aldrich Cat #15381-1 MG) to block Fc-receptor binding. CD4+ T cells cocultured with MDC1 were tested weekly for the presence of HIV-1 p24 by surface staining for CD3 (APC-H7, clone SK7; BD Biosciences Cat #641397; RRID: AB_1645731) and CD4 (Pacific Blue, clone RPA-T4; BD Biosciences Cat #558116; RRID: AB_397037), and intracellular staining with KC57-FITC antibody (clone FH190-1-1, Beckman Coulter Cat #6604665). Antigen-specific CTL responses were assessed by exposing CTL to HIV-1 Gag 9-mer peptides (1 µg/mL) or media alone, and incubating with CD107a-FITC (clone H4A3; BD Biosciences Cat #555800; RRID: AB_396134) stain mix containing 0.1% monensin (BD GOLGI STOP™, BD Biosciences Cat #554724) for six hours at 37° C. Cells were then stained for viability (LIVE/DEAD™ Fixable Aqua Dead Cell Stain, Life Technologies Cat #L34957), surface expression of CD3 (APC-H7, clone SK7; BD Biosciences) and CD8 (PerCP-Cy5.5, clone SK1; BD Biosciences Cat #341051; RRID: AB_400298), and intracellular expression of IFN-γ (IFN-γ-ALEXAFLUOR® 700, clone B27; BD Biosciences Cat #557995; RRID: AB_396977).

Functional characterization of differentially matured DC. DC production of IL-12p70 in response to CD40L-transfected J558 cells (J558-CD40L) stimulation was determined as previously described (Mailliard R B, 2013). Briefly, DC were plated (2.5×10⁴ cells/well) in a 96-well flat-bottom plate and stimulated with J558-CD40L (5×10⁴ cells/well) for 24 hours. Culture supernatants were collected and tested by IL-12p70 ELISA using the following reagents: Recombinant Human IL-12 Standard (R&D Systems Cat #219-IL-005), Primary Human IL-12 mAb (Thermo Scientific Cat #M122), Secondary Human IL-12 mAb, Biotin-labeled (Thermo Scientific Cat #M121B), HRP-conjugated Streptavidin (Thermo Scientific Cat #N100), TMB Substrate Solution (Thermo Scientific Cat #N301), Stop Solution (Thermo Scientific Cat #N600).

Induction of HIV-1 LR in CD4+ T cells MDC1 were tested for their ability to induce HIV-1 LR by coculture with autologous CD4+ T cells in the absence or presence of SEB (Sigma-Aldrich Cat #S4481), CMV pp65 (CMVpp65 Recombinant Protein, Miltenyi Biotec Cat #130-091-824, or PEPTIVATOR® CMV pp65, Miltenyi Biotec Cat #130-093-435), HIV-1 Gag (HIV-1 IIIB PR55 Gag Recombinant Protein, NIH AIDS Reagent Program Cat #3276; HIV-1 Gag Recombinant Protein, Sigma-Aldrich Cat #H 0160; or HIV-1 Consensus 15-mer Peptides (Sigma-Aldrich), or influenza M1 antigen (Influenza M1 Protein (A/California/04/2009) (H1N1), eEnzyme Cat #IA-M1-023P, or PEPTIVATOR® Influenza A (H1N1) MP1, Miltenyi Biotec Cat #130-097-285). Briefly, total CD4+ T cells were isolated from cryopreserved PBL derived from HIV-1-infected MACS participants by negative magnetic bead separation using an EASYSEP™ Human CD4+ T Cell Enrichment Kit (STEMCELL Technologies Cat #19052). CD4+ T cells were cocultured with DC in complete IMDM at a ratio of either 1:7 (100,000 DC: 750,000 CD4+ T cells) or 1:10 (100,000: 1×10⁶) for seven days in 48-well plates. Total CD4+ T cells from HIV-1-infected MACS participants were treated with DYNABEADS® Human T-Activator CD3/CD28 (Life Technologies Cat #11131D) and implemented as a positive control in LR experiments. The cytokines rhIL-2 (PROLEUKIN®, 100 U/mL; Prometheus Laboratories, Inc. Cat #NDC65483-116-07) and rhIL-7 (1 µg/mL; Miltenyi Biotec Cat #130-095-361) were added to the cultures on day 4, and culture supernatants were harvested on day 7 for quantitation of HIV-1 RNA. Where stated, cocultures were maintained and the T cells tested for intracellular expression of p24 on days 14-20 by flow cytometry. CD40L blocking antibody (clone MK13A4, 10 µg/mL; Enzo Life Sciences Cat #ALX-805-037-C100; RRID: AB_2076315) or LEAF™ Purified Mouse IgG1,k isotype antibody (clone MG1-45, 10 µg/mL; Biolegend Cat #401404) was used where shown.

Relative Quantification of HIV-1 Gag RNA. Culture supernatants were ultra-centrifuged (Sorvall Stratos Biofuge) at 45,000×g for 1 hour at 4° C. to obtain viral pellets from which total RNA was isolated by the RNA-BEE™ method (TEL-TEST, Inc. Cat #CS-105B). Five microliters of RNA were used for detection of reverse transcription using TAQMAN® Reverse Transcription Reagents (Life Technologies Cat #N8080234) according to the manufacture's protocol. A 20 µL TAQMAN® PCR was performed by mixing 5 µL cDNA with TAQMAN® Universal PCR Master Mix (Thermo Fisher Cat #4364340), 500 nM each of forward (5'-CCCATGTTTTCAGCATTATCAGAA-3', Integrated DNA Technologies, SEQ ID NO:9) and reverse primers (5'-CCACTGTGTTTAGCATGGTGTTTAA-3', Integrated DNA Technologies, SEQ ID NO:10), and 250 nM FAM/MGB-labeled probe (5'-FAM-AGCCACCC-CACAAGA-MGB-3'; Thermo Fisher Cat #4316033, TMgagP2, SEQ ID NO:11). Real-time PCR was performed using the using the ViiA 7 A&B Applied Biosystems instrument (Life Technologies) and the following cycling conditions: 50° C. for 2 min, 95° C. for 10 min, 40 cycles of 95° C. for 15 sec, and 60° C. for 1 min. Real-time PCR primers and probes were based on the HIV-1 pNL4.3 sequence encoding the gag region. Serially diluted pNL4.3 plasmid DNA ranging from 10¹ to 10⁶ copies applied to each PCR assay served as the HIV-1 standard curve. A no template control was included in each assay to control for PCR cross-contamination, and each sample was assayed in triplicate. QUANTSTUDIO™ Real-time PCR Software (Applied Biosystems, Foster City, CA) was used for PCR data analysis.

Generation and characterization of HIV-1-infected CD4+ T cell targets. Total CD4+ T cells cocultured with antigen-presenting MDC1 and were tested weekly for the presence of HIV-1 p24 antigen by intracellular flow cytometry staining with KC57-FITC antibody (clone FH190-1-1, Beckman Coulter Cat #6604665). Target cells were pre-screened for p24 expression, and cryopreserved for later use as targets when they reached at least 10% positivity.

Induction and expansion of autologous CTL. Total CD8+ T cells were isolated from cryopreserved PBL by negative magnetic bead separation using an EASYSEP™ Human CD8+ T Cell Enrichment Kit (STEMCELL Technologies Cat #19053). To induce CTL responses as previously described (Mailliard RB, 2013), CD8+ T cells were cocultured with autologous differentially matured DC loaded with either HLA-A2-restricted Gag p24 Gag$_{151-159}$ 9-mer peptide epitopes when using HIV-1-negative blood donors, or Gag p17/p24 overlapping 15-mer peptides (1 µg/mL, Sigma-Aldrich) when using HIV-1-infected MACS participants. The cocultures (75,000 DC: 750,000 CD8+ T cells) were treated with or without the addition of either 25,000 gamma-irradiated (5000 rad) CD40L-transfected J588 cells (Cella M; 1996) or MEGACD40L® Protein (0.25 µg/mL; Enzo Life Sciences Cat #ALX-522-110-C010) where stated. On day 5, rhIL-2 (250 U/mL) and rhIL-7 (10 ng/mL) were added to the cultures and every three days thereafter. On day 12, T cell cultures were restimulated with either gamma-irradiated HLA-A2$^+$ T2 cells (for induction of primary CTL responses in HLA-A2$^+$ HIV-1-negative donors) or differentially matured autologous DC loaded with autologous 9-mer peptides (1 µg/mL) corresponding to the viral antigens and DC type used in the initial stimulation. Antigen-specific readout assays were performed between days 20-24 to assess CTL activity.

IFN-γ ELISPOT assays. Autologous CTL (3×10$^4$/well) were tested for reactivity to individual and pooled Gag 9-mer peptide antigens (1-10 µg/mL) by ELISPOT assay using anti-human IFN-γ and biotin monoclonal antibodies (clones 1-D1K and 7-B6-1; Mabtech Cat #3420-6-1000) as previously described. Recorded values were net responses compared to control wells consisting of CTL exposed to assay medium alone.

HIV-1 antigen-expressing cell killing assays. CTL effector function was assessed as described previously, with modifications (Smith KN, 2016). Briefly, MDC1-stimulated total CD8$^+$ T cells were cocultured with autologous MDC1-induced CD4$^+$ target cells at various effector:target (E:T) ratios for 18 hours at 37° C. Harvested cocultures were stained for surface expression of CD8 (PerCP-Cy5.5, clone SK1; BD Biosciences Cat #341051; RRID: AB_400298) and intracellular expression of HIV-1 p24 (KC57-FITC, clone FH190-1-1; Beckman Coulter Cat #6604665). Effector CD8$^+$ cells were excluded from analysis gating, and the percent reduction in infected CD4$^+$ T cells was determined at each ET ratio. For the colorimetric cytolytic assays described in the supplemental material, autologous CD4 cells were stained with either CFSE (eBioscience Cat #65-0850) or CELLTRACE™ Violet (Thermo Fisher, Cat #C34557) dyes following the manufacturer's protocols. Target cells (CFSE) were then loaded with individual peptides at 100 ng/mL in PBS for 60 min at room temperature (RT); excess unbound peptide was removed by washing. The CFSE and CELLTRACE™ Violet dye-labeled cells were mixed in equal numbers and coincubated for 18 hours with autologous CTL at various ET ratios. The antigen-specific killing of HIV-1 peptide-loaded CD4$^+$ T cells (green) was calculated based on relative changes in percentages of the differentially stained target cells remaining, using by flow cytometry analysis.

Viral outgrowth assays. Total CD8$^+$ T cells were cocultured with autologous p24-expressing CD4$^+$ target cells at various E:T ratios as described for the CTL kill assay. Cultures were maintained for eight days, after which culture supernatants were harvested and tested by p24 ELISA (Frederick National Laboratory for Cancer Research, Frederick, MD) for CTL-induced viral suppression (Mailliard RB, 2013).

Quantification of replication-competent HIV-1. Culture supernatants harvested from LR and viral outgrowth assays were spinoculated onto TZM-bl cell (NIH AIDS Reagent Program Cat #8129-422; RRID: CVCL_B478) monolayers (30,000 cells/well) for four hours at 300× g and co-cultured for 48 hours. BETA-GLO® reagent (Promega Cat #E4740) was added to PBS-washed TZM-bl cell monolayers and incubated for 1 hour at room temperature. Control supernatants from cultured CD4$^+$ T cells of an uninfected donor were treated in parallel. Chemiluminescence from the TZM-bl cells was detected by luminometer as previously described (Sanyal A, 2017). Sample wells were considered positive for the presence of replication-competent virus if the chemiluminescent signal exceeded the mean+2 S.D. of a control sample.

Figure 1B:
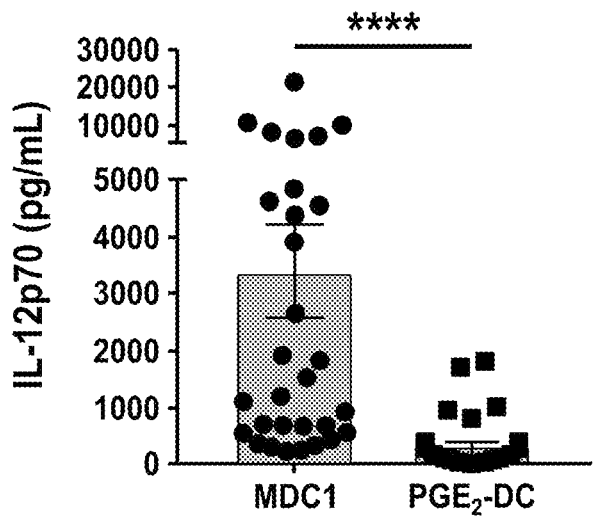
Figure 2:
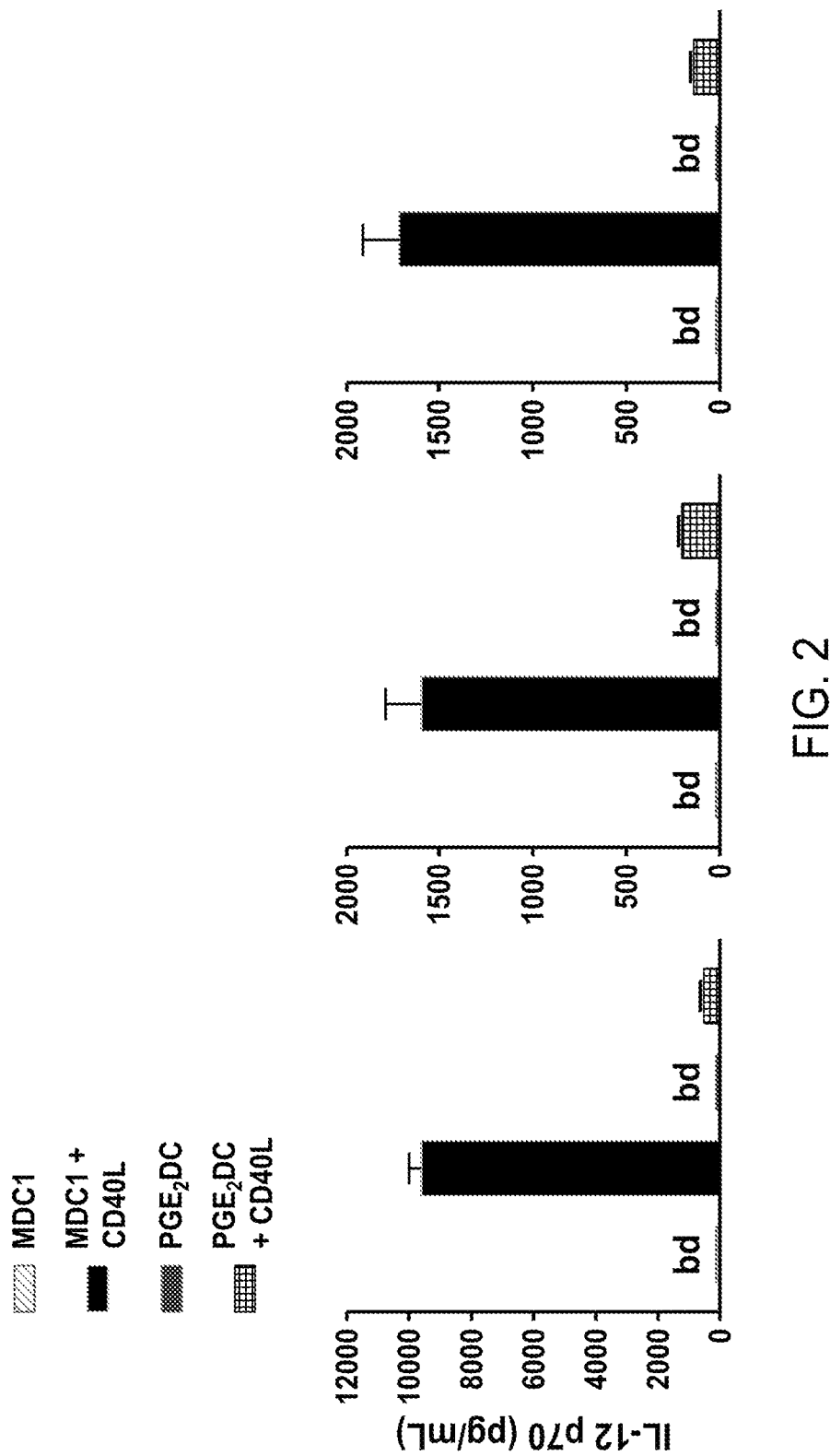
FIG. 2 shows that MDC1 are programmed to produce enhanced levels of IL-12p70 upon stimulation with CD40L. MDC1 were plated ($2.5\times10^4$ cells/well) in a 96-well flat-bottom plate and cultured in presence or absence of J558-CD40L ($5\times10^4$ cells/well) for 24 hours. Culture supernatants were collected and tested by IL-12p70 ELISA. bd=below detection limit of the assay (37 pg/ml).
Figure 3:
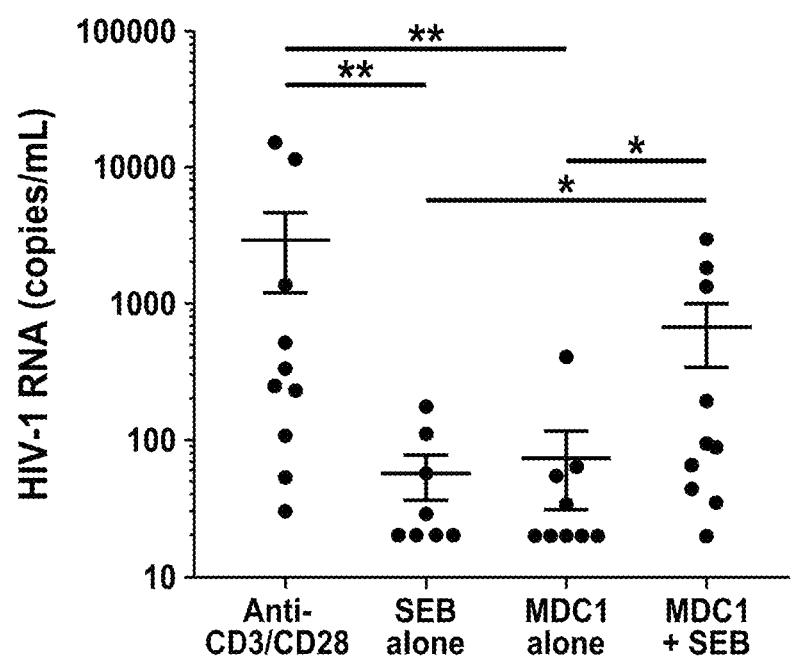
FIG. 3 shows the influence of antigen presentation on MDC1-mediated HIV-1 latency reversal in CD4$^+$ T cells. MDC1 were cocultured with autologous CD4$^+$ T cells in the presence or absence of SEB antigen. Cell culture supernatants were analyzed by qRT-PCR for HIV-1 RNA at day 7. P values comparing viral RNA levels were determined by multilevel mixed-effects tobit regression analyses. Error bars indicate mean±SEM. *P<0.05 and **P<0.01.
Figure 4A:
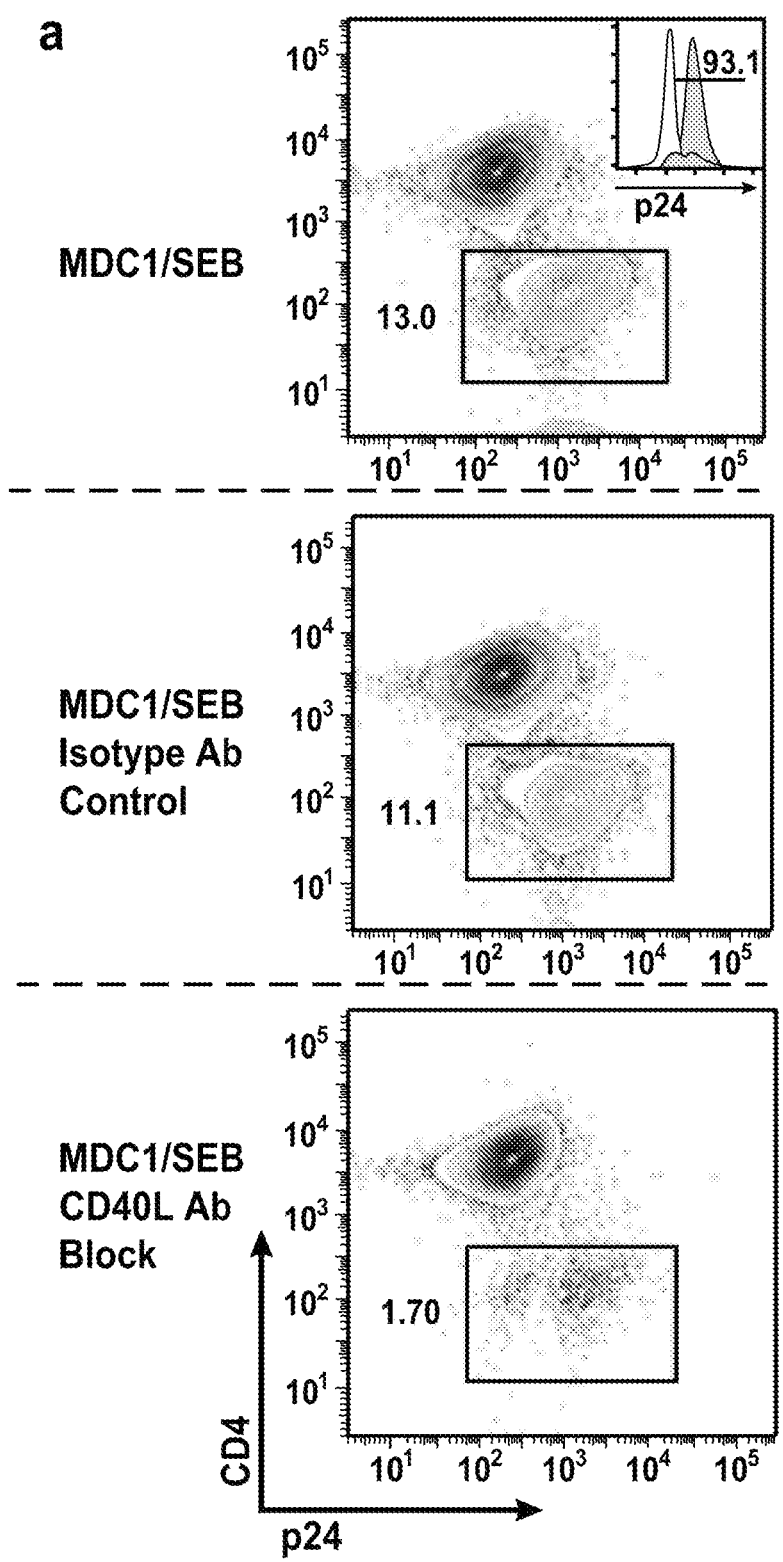
FIG. 4(a-d) shows the role of CD40/CD40L interaction in the MDC1-mediated 'kick' of latent HIV-1. MDC1 were cocultured with autologous CD4+ T cells and SEB to induce HIV-1 LR, in the presence or absence of CD40L blocking antibody. a) Representative flow cytometry plot of day 15 cultures. Downregulation of CD4 expression (gated area) corresponds with increased expression of p24 in the absence of CD40L blockade. Shaded histogram peak corresponds with p24 expression of CD4 downregulated population. b, c) Graphical representation of CD4 downregulation (b) and p24 expression (c) of populations described in (a); n=5. d) Day 7 cell coculture supernatants were analyzed by qRT-PCR for HIV-1 RNA; n=3. Differences between MDC1/SEB-mediated LR in the absence or presence of CD40L blocking antibody were compared by Wilcoxon matched-pairs signed-ranks test. Error bars indicate mean±SEM. *P<0.05.

Statistical analyses. Statistical analyses for ELISA and ELISPOT data (FIGS. 1b and 1c) were calculated using Wilcoxon matched-pairs signed-ranks test and a linear mixed model with 95% confidence intervals, respectively. Differences between MDC1-mediated LR were determined by multilevel mixed-effects tobit regression analyses (FIGS. 2 and 4a) and Wilcoxon matched-pairs signed-ranks test (FIGS. 3 and 4c-4d).

Example 2: MDC1 Effectively Induce Primary HIV-1-Specific CTL Responses with CD40L "Help"

Figure 1C:
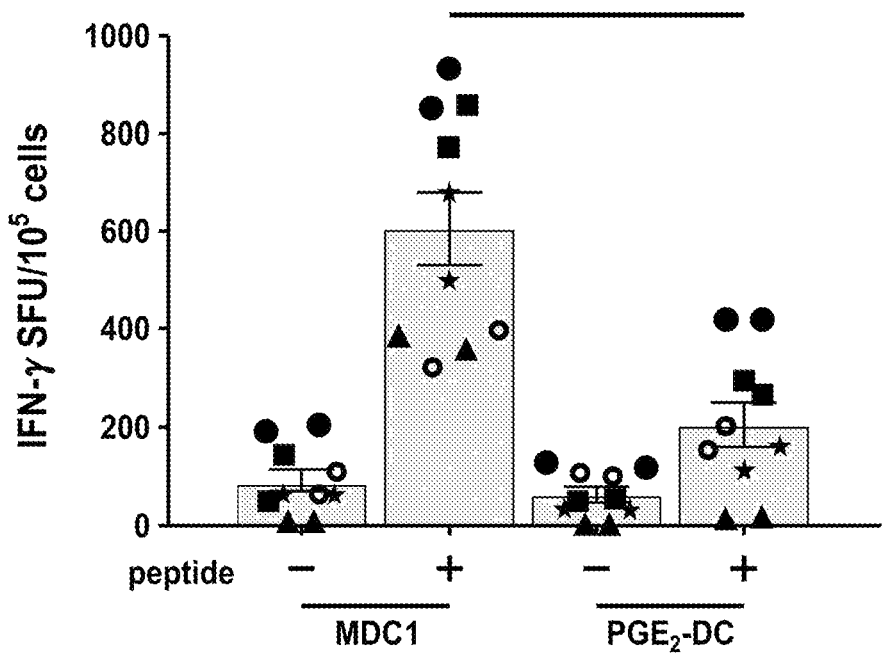
Figure 1D:
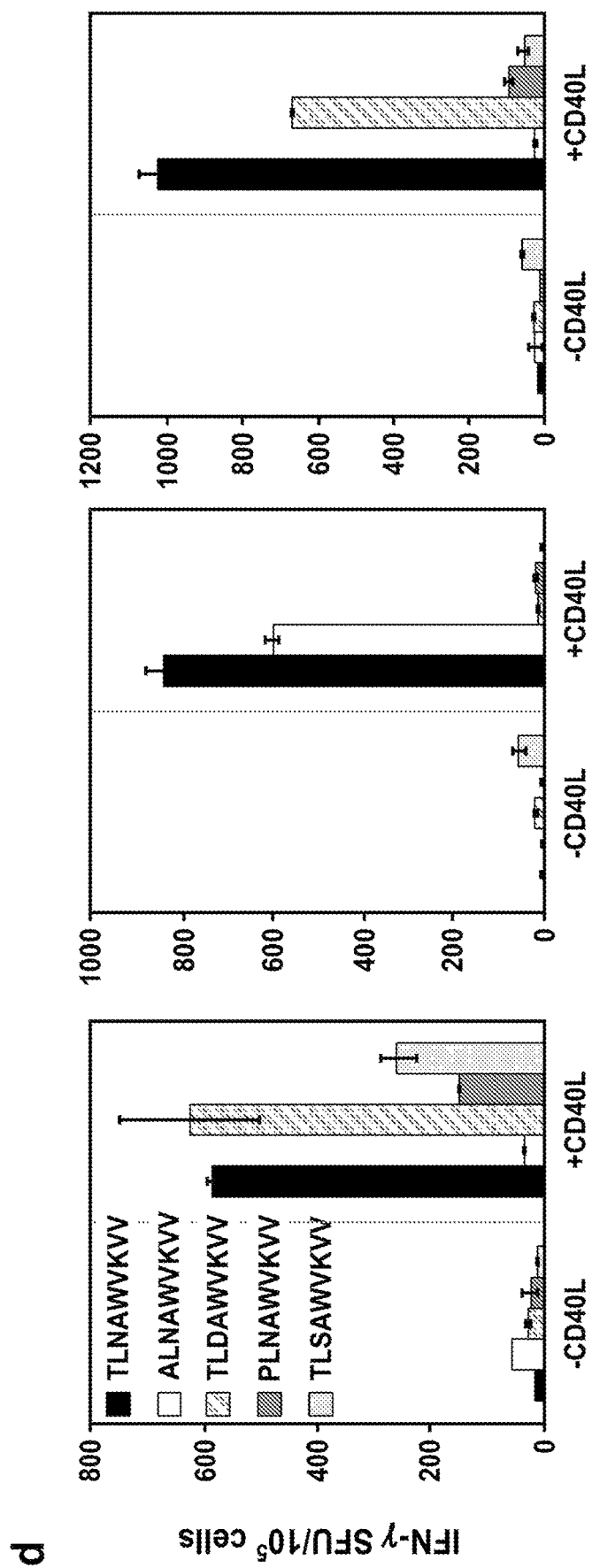

The use of two clinically applicable, differentially activated DC preparations was compared using blood products from HLA-A2$^+$ HIV-1-naïve blood bank donors to test their capacity to induce primary HIV-1-specific CTL responses. MDC1 were characterized and defined by their mature phenotypic status, expressing high levels of CD86 and CD83, and their high capacity to produce IL-12p70 upon subsequent stimulation with the CD4$^+$ T cell 'helper' signal CD40L, while PGE2-DC were IL-12p70-deficient and less responsive to CD40L signaling (FIGS. 1a and 1b, and FIG. 2) (Zaccard CR, 2015; Mailliard RB, 2004). These DC types were loaded with HLA-A2-restricted HIV-1 peptide antigen and used as in vitro stimulators of autologous CD8$^+$ T cells, in the presence of gamma-irradiated (5000 rad) CD40L-expressing J558 cells (J558-CD40L), which served as a CD40L$^+$ T$_H$ cell surrogate. In doing so, the MDC1 was found to have a higher CTL priming capacity compared to PGE2-DC (FIG. 1c). Importantly, the effective in vitro induction of long-term CTL responses by MDC1 required the presence of CD40L 'help' during the initiation of the priming cocultures (FIG. 1d).

Example 3: Antigen Presentation by Autologous MDC1 Drives HIV-1 LR in CD4$^+$ T Cells Because MDC1 were shown to be strong inducers of primary CTL responses (FIG. 1), their capacity to reactivate or 'kick' latent HIV-1 from latency to expose the infected cells for subsequent CTL targeting was tested.

Figure 9A:
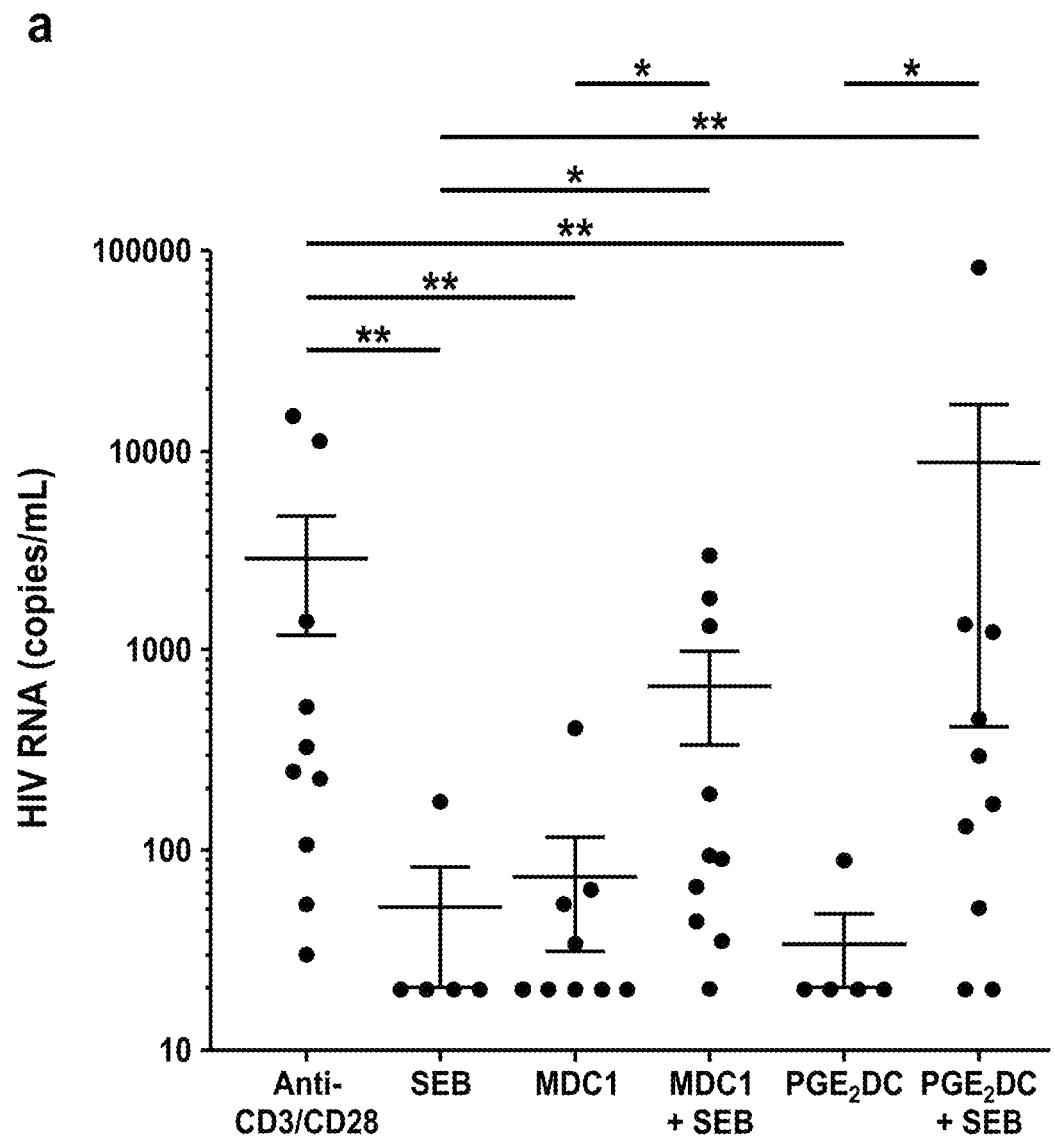
FIG. 9(a-c) shows influence of antigen presentation on DC-mediated HIV-1 latency reversal in CD4+ T cells. a, b) Differentially polarized DC were cocultured with autologous CD4+ T cells in the presence or absence of SEB antigen. Cell culture supernatants were analyzed by qRT-PCR for HIV-1 RNA at day 7. P values comparing viral RNA levels were determined by multilevel mixed-effects tobit regression analyses. Error bars indicate mean±SEM. *P<0.05 and **P<0.01. c) Latency reversal scores based on data represented in (a). LR+, latency reversal positive; BD, below limit of detection.
Figures 9B, 9C:
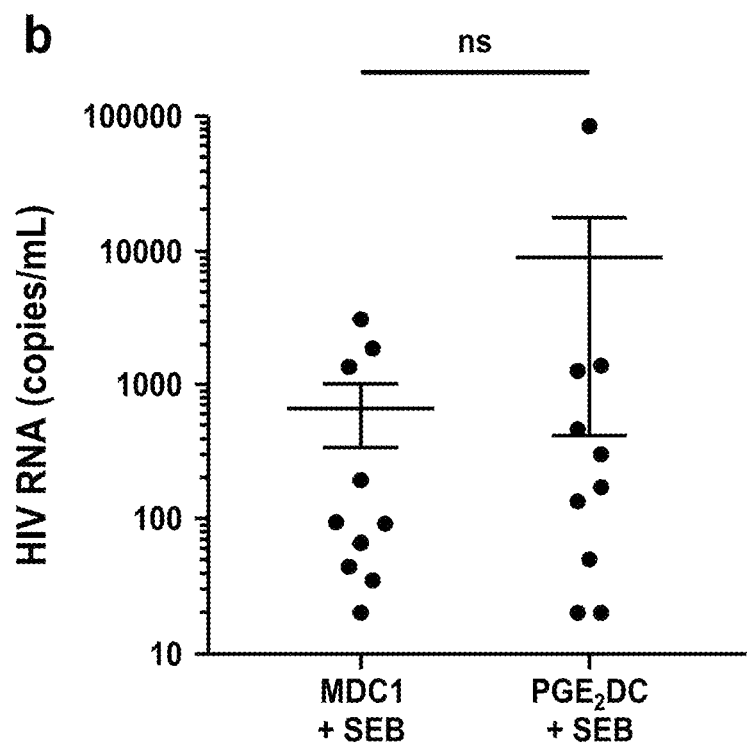

MDC1 were generated from ART virally suppressed HIV-1-infected MACS participants and cocultured with autologous peripheral blood CD4$^+$ T cells in the presence or absence of SEB antigen. SEB was used because as a superantigen, it can effectively facilitate immune cross-talk between the antigen-presenting cells and a large percentage (approximately 30%) of SEB responsive T cells (Zaccard CR, 2015). CD4$^+$ T cells treated with anti-CD3/CD28 mAb-coated beads were used as a positive LRA control (Spina CA, 2013). qRT-PCR analysis of HIV-1 RNA presence in day 7 coculture supernatants revealed that MDC1 indeed acted as a strong LRA in an SEB antigen-dependent manner (FIG. 3, MDC1 alone vs MDC1+SEB, P<0.05, and FIG. 9a, MDC1 alone vs. MDC1+SEB, P<0.05), as did PGE2-DC (FIG. 9a, PGE2-DC alone vs. PGE2-DC+SEB, P<0.05). Significant differences in transcription of proviral DNA were also observed between positive (anti-CD3/CD28) and negative (SEB) experimental controls (P<0.01) and between SEB vs. DC+SEB conditions (SEB vs. MDC1+SEB, P<0.05; SEB vs. PGE2-DC, P<0.01). No significant differences in LRA activity between anti-CD3/CD28 and DC+SEB stimulation or between SEB and DC alone conditions were detected. Importantly, MDC1 and PGE2-DC also did not differ in their abilities to mediate antigen-dependent HIV-1 latency reversal (FIG. 9b), which becomes most apparent when normalizing the data based on mRNA expression levels above (LR+) or below the limit of detection (BD) by qRT-PCR (FIG. 9c).

Example 4: Role of CD40/CD40L Interaction in MDC1-Mediated 'Kick' of Latent HIV-1

DC crosstalk with CD40L$^+$ T$_H$ cells plays a critical role in the induction and survival of long-term CTL responses (Feau S, 2012; Bennett SR, 1998; Ridge JP, 1998; Schoenberger SP, 1998). Because it has been previously shown that MDC1 are particularly sensitive to CD40L signaling (Zaccard CR, 2015), and that this CD4$^+$ T cell-derived 'helper' factor is required for effective MDC1-mediated in vitro priming of de novo CTL responses (FIG. 1d), experiment was done to determine if CD40/CD40L cross-talk between the MDC1 and CD4$^+$ T cells was playing a role in the MDC1-mediated HIV-1 LR. Indeed, it was found that blocking CD40/CD40L interaction strongly decreased the effectiveness of MDC1-mediated LR. The impact of this CD40L signaling inhibition on MDC1-mediated LR was clearly evident when analyzing the activated CD4$^+$ T cells by flow cytometry, where the addition of an anti-CD40L blocking antibody resulted in a marked inhibition of CD4 downregulation (87.7%±3.1%, P<0.05; FIGS. 4a and 4b), a phenomenon associated with HIV-1 protein translation (Chen BK, 1996). As expected, this inhibition of CD4 downregulation by addition of the CD40L blocking antibody was associated with abrogation of intracellular p24 expression (90.8%±7.0%) (FIGS. 4a and 4c; P<0.05) induced in autologous CD4$^+$ T cells, and with the reduction in HIV-1 RNA content in the day 7 co-culture supernatants measured by qRT-PCR (FIG. 4d, 94.1%±6.1% inhibition). Importantly, the addition of an isotype control antibody to the MDC1:T cell cocultures had no significant impact on the induced changes in CD4 expression or HIV-1 expression resulting from LR (FIGS. 4a-4d). Taken together, these data support the importance of the involvement of cognate antigen-driven bidirectional signaling events between MDC1 and antigen-responsive CD4$^+$ T cells in HIV-1 LR.

Example 5: CMV and HIV-1 Antigen-Driven Reactivation of Latent HIV-1 by MDC1

Figure 5A:
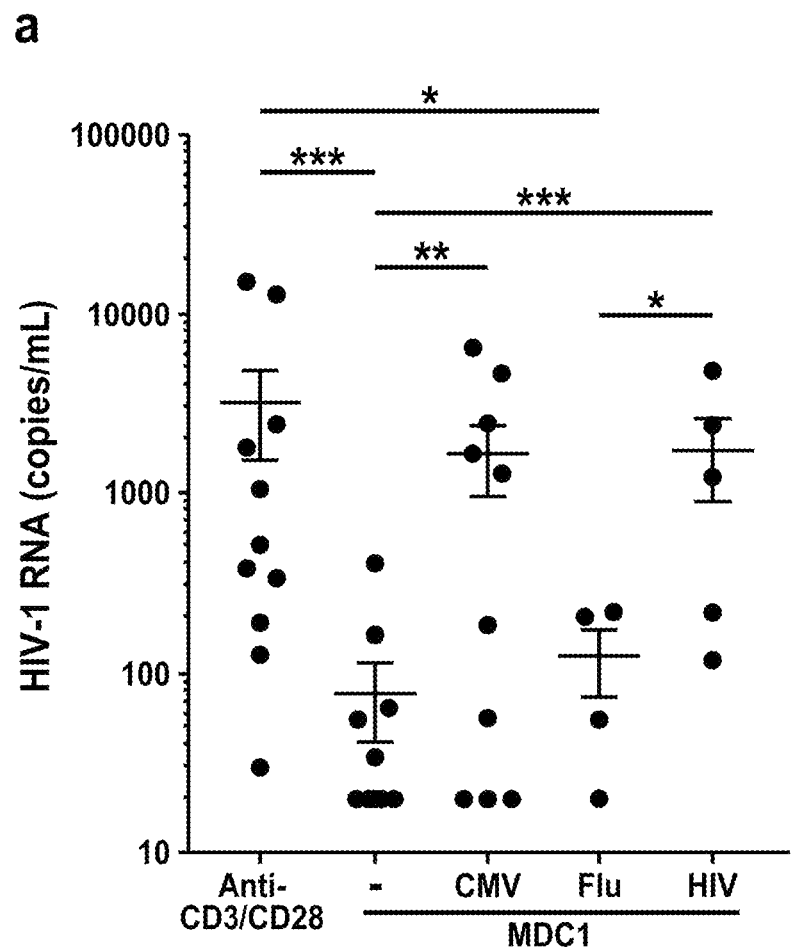
FIG. 5(a-d) shows that CMV and HIV antigen presentation drives MDC1-mediated HIV-1 latency reversal. a) MDC1 were loaded with either CMV pp65, HIV-1 Gag, or influenza M1 antigen and tested for their ability to induce LR in autologous CD4$^+$ T cells. Culture supernatants were assayed by qRT-PCR for detection of HIV-1 RNA at day 7. b) Representative flow cytometry plots of p24 expression of day 20 cocultures, gated on total CD4$^+$ T cells. c) Graphical representation of MDC1/antigen-induced CD4 downregulation in cocultures described in (b), as measured by flow cytometry. d) Expression of p24 expression in cell populations detailed in (b). P values comparing viral RNA levels were determined by multilevel mixed-effects tobit regression analyses. Error bars indicate mean±SEM. *P<0.05, P<0.01, and *P<0.001.

It was shown above that MDC1-mediated transcription of HIV-1 DNA (FIG. 3) and subsequent translation of p24 (FIGS. 4a and 4c) are both dependent on the presence of SEB superantigen and on CD40/CD40L signaling. However, to simulate a clinically relevant method of HIV-1 LR, common viral MHC class II antigens are utilized as a part of MDC1-based therapeutic to promote interaction with CD40L-expressing CD4$^+$ T$_H$ cells, to both provide immune 'help' for MDC1-mediated induction of HIV-1-specific CTL responses and facilitate MDC1-mediated exposure of viral antigen-specific CD4$^+$ T cells harboring latent HIV-1. MDC1 alone or loaded with CMV pp65, HIV-1 Gag, or influenza A virus M1 protein (representing a common, non-persistent virus antigen) were tested for their ability to induce latency reversal in autologous CD4$^+$ T cells (FIG. 5). It was found that MDC1-mediated LR was antigen-dependent, with CMV and HIV-1 antigen having notable LR activity, while the influenza virus antigen did not (FIGS. 5a-5d). MDC1/CMV- and MDC1/HIV-1-mediated increases in extracellular virion-associated HIV-1 RNA were significantly greater than those induced by MDC1 alone (FIG. 4A; P<0.01 and P<0.001, respectively). Importantly, MDC1 presenting either CMV or HIV-1 antigen exposed latent HIV-1 cellular reservoir targets, identified by a marked downregulation in CD4 expression (FIG. 5c) that corresponded to increases in intracellular p24 (FIGS. 5b and 5d).

Example 6: MDC1-Induced CTL Effectively Kill MDC1-Exposed CD4$^+$ T Cell Targets Harboring Replication-Competent HIV-1

Figure 6A:
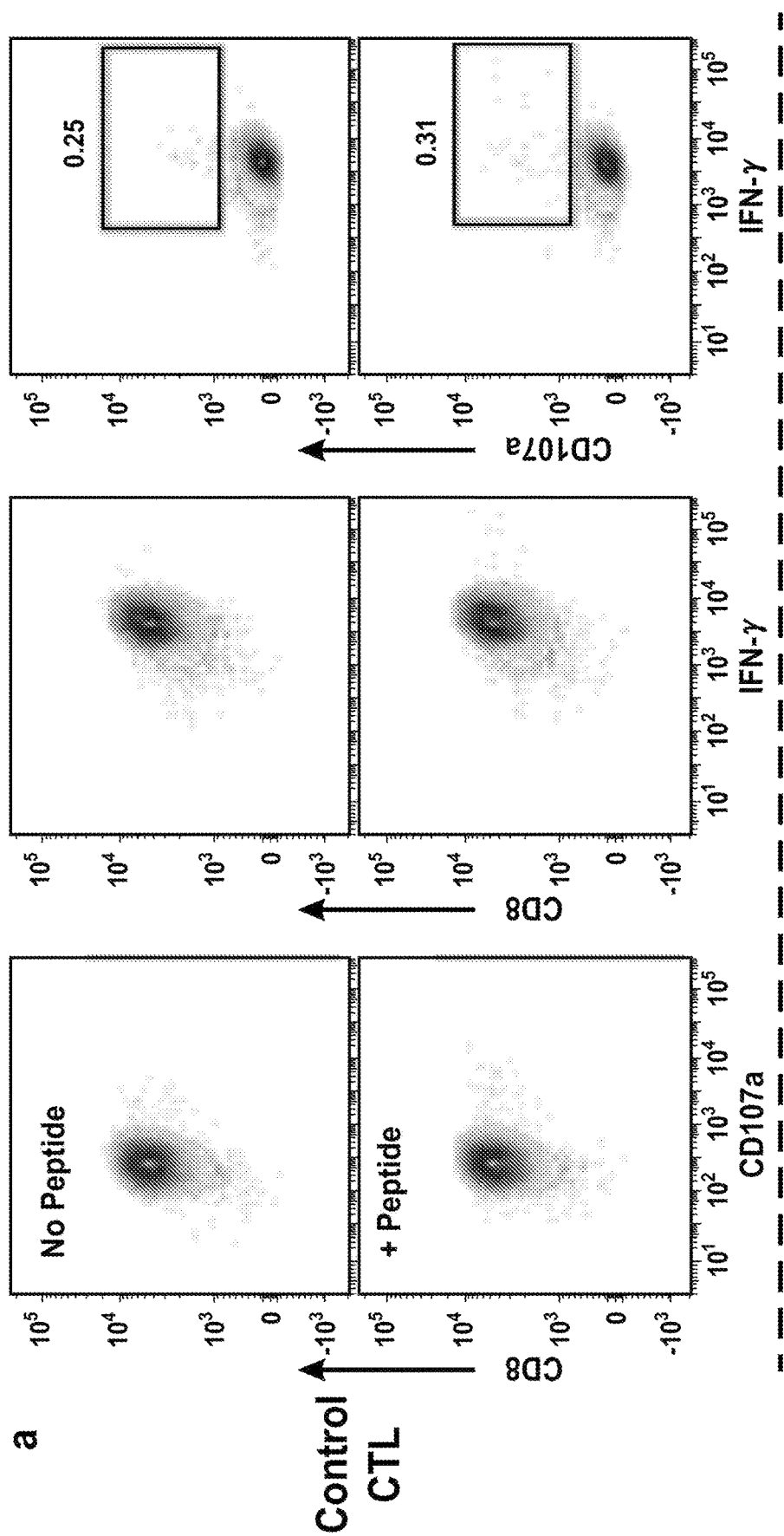
FIG. 6(a-d) shows that MDC1-induced broadly reactive HIV-1-specific CTL effectively kill HIV-1 infected CD4$^+$ T cells exposed by MDC1. a) MDC1 generated from HIV-1-infected, ART-suppressed individuals were loaded with HIV-1 Gag peptides and used to induce broadly reactive antigen-specific autologous CTL as determined by flow cytometry staining for CD107a and IFN-γ. b) Polyclonal IFN-γ responses to individual Gag 9-mer epitopes by MDC1-induced CTL described in (a). c) HIV-1 latency reversal was induced by MDC1 and SEB or antigen in CD4+ T cells. Target cells (T) were coincubated with autologous MDC1-induced effector CTL (E) at various E:T ratios for 18 hours. CTL-induced target killing was measured by loss of HIV-1 Gag p24-expressing target cells using flow cytometry. d) Summary of 5 independent flow cytometry cytotoxicity experiments. Square symbols represent MDC1/SEB-induced target cells; circles indicate MDC1/viral antigen-induced targets. Error bars indicate mean±S.D.
Figure 6A:
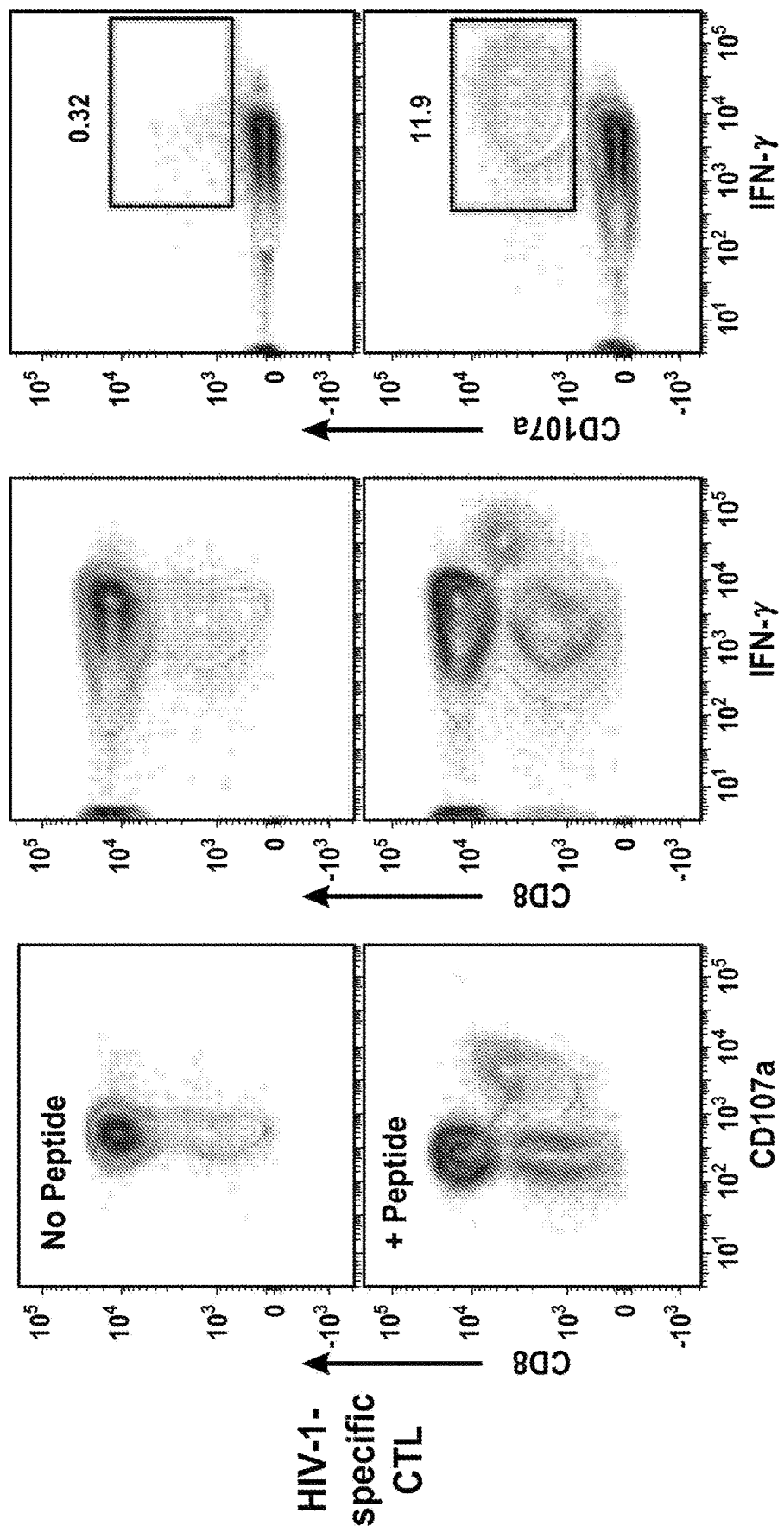
Figure 6B:
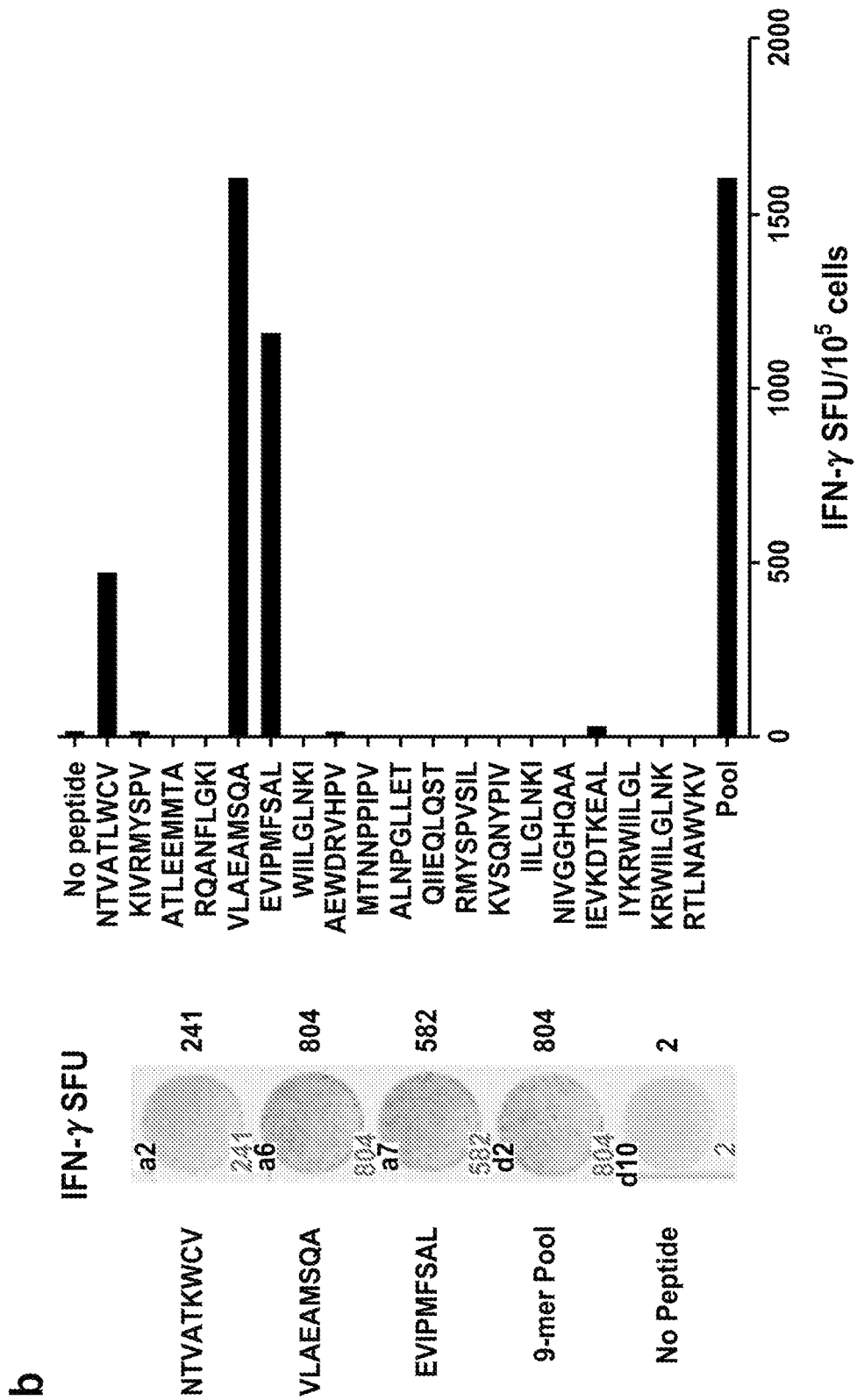
Figure 7C:
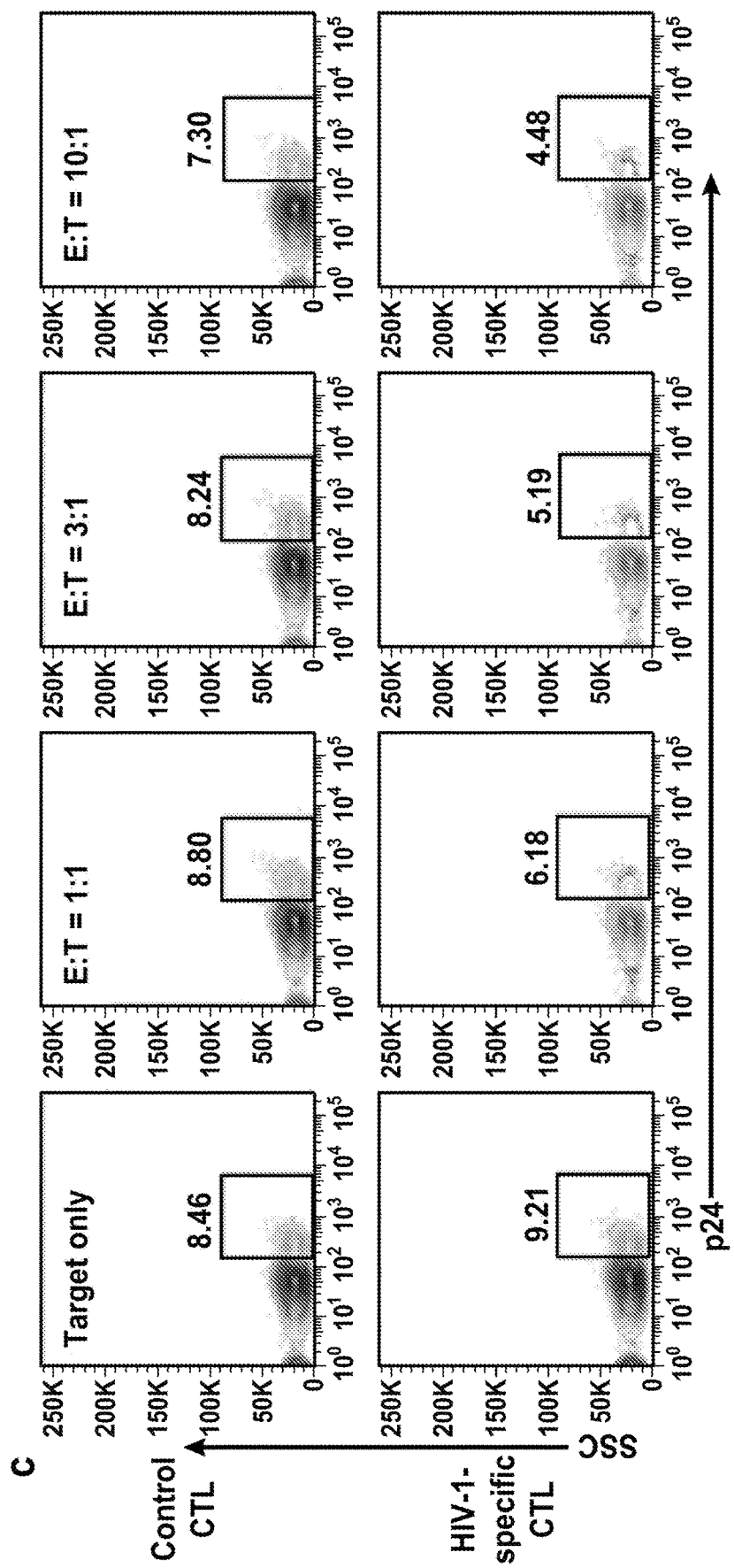
FIG. 7(a-d) shows selective killing of HIV-1 antigen-expressing CD4+ T cells by autologous MDC1-induced HIV-specific CTL. MDC1 generated from HIV-1-infected, ART-suppressed individuals were cultured with or without HIV-1 Gag peptides or with irrelevant control peptides (Influenza M1) and used to induce autologous CTL. a) CD4+ T cells were labeled with CELLTRACE™ dye (violet) or CFSE (green) for use as target cells. The CFSE-labeled cells were additionally loaded with relevant HIV-1 Gag 9-mer peptides. The cells were mixed in equal numbers and coincubated for 18 hours with MDC1-induced autologous CTL at various E:T ratios. b) The antigen-specific killing of HIV-1 peptide-loaded CD4+ T cells (green) was calculated based on relative changes in the percentages of the viable differentially colored target cells. c) p24-expressing HIV-1 infected target cells (T) were coincubated with autologous MDC1-induced effector CTL at various E:T ratios for 18 hours. CTL-induced target killing was measured by loss of HIV-1 Gag p24-expressing target cells using flow cytometry. d) Comparison of cytotoxic activity of HIV-specific CTL with CTL cultured in the absence of HIV-1 Gag peptides (Control CTL) in a representative donor (shown in a). Error bars indicate mean±S.D.
Figure 7D:
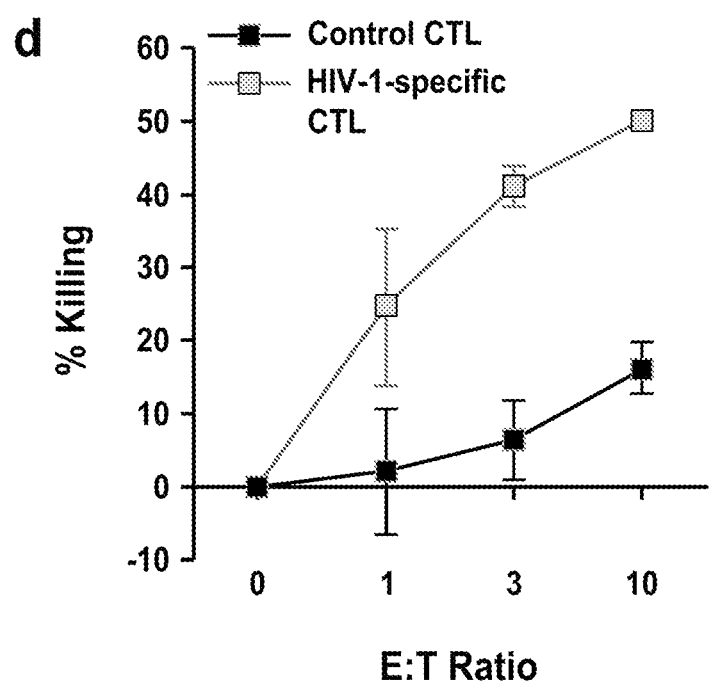
Figure 8A:
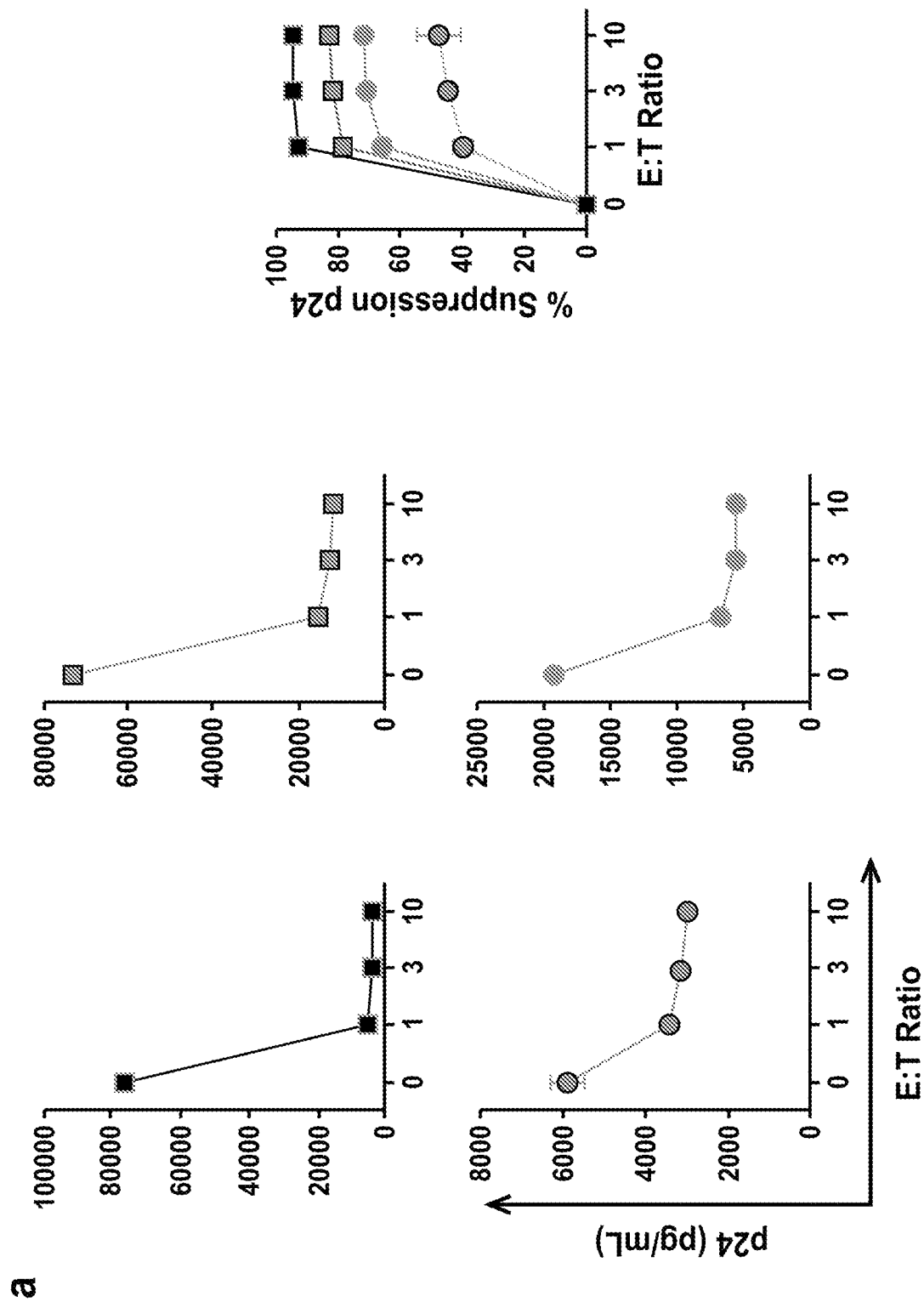
FIG. 8(a-b) shows HIV-1-specific CTL control MDC1-exposed targets harboring replication-competent HIV-1. a) HIV-1 latency reversal was induced in CD4+ T cells by MDC1 presenting SEB, CMV pp65, HIV-1 Gag, or influenza M1 antigen. Target cells (T) were cocultured with autologous MDC1-induced effector CTL (E) at various E:T ratios for 8 days. Left panels: Culture supernatants were tested by p24 ELISA to measure CTL-induced viral suppression. Right panel: Graphical compilation of individual experiments. Error bars indicate mean±S.D. b) Culture supernatants collected from viral outgrowth assays and cultured on TZM-bl cell monolayers were tested for chemiluminescence. Left: Graphical compilation of individual experiments (RLU, relative light units). Solid symbols indicate HIV-1-infected participant samples; open symbols represent HIV-1-negative samples assayed in parallel. Right: CTL-induced suppression of replication-competent HIV-1. Square symbols represent MDC1/SEB-induced target cells; circles indicate MDC1/viral peptide antigen-induced targets.

MDC1 loaded with autologous HIV-1 Gag peptides were used to induce antigen-specific CTL, as determined by flow cytometry analysis for antigen-induced expression of CD107a and interferon (IFN)-γ (FIG. 6a) and by IFN-γ ELISPOT (FIG. 6b). Antigen-induced downregulation of CD8 expression, a characteristic previously shown to be associated with enhanced cytolytic capacity, was evident along with high expression of CD107a and IFN-γ in the CTL generated ex vivo using the HIV-1 antigen-presenting MDC1 (FIG. 6a). Also, the CTL responses induced by MDC1 were broadly reactive to a range of individual Gag 9-mer epitopes by IFN-γ ELISPOT (FIG. 6b). The antigen-specific killing capacity of these CTL was initially tested by coculturing them overnight with differentially labeled Gag 9-mer peptide antigen-loaded or antigen negative (control) autologous CD4$^+$ T cell targets, which clearly showed the selective elimination of the antigen-loaded target cells as determined by flow cytometry analysis (FIGS. 7a and 7b). More importantly, the LR activity of CMV and HIV-1 antigen-presenting MDC1 resulted in the effective exposure of HIV-1-infected antigen-expressing target cells that were also recognized and efficiently controlled by the MDC1/Ag-induced HIV-1-specific CTL in short-term cytotoxicity assays (75.4%±14.3% killing), indicated by a CTL dose-dependent decrease of p24-expressing CD4$^+$ T cells (FIGS. 6c and 6d; FIGS. 7c, 7d). This pattern was consistent regardless of whether HIV-1 or CMV antigen was used to induce MDC1-mediated LR. Furthermore, the CTL suppressed viral outgrowth from the infected cells in long-term cocultures by 74.4%±20.2%, as measured by p24 ELISA (FIG. 8a, Right).

Figure 8B:
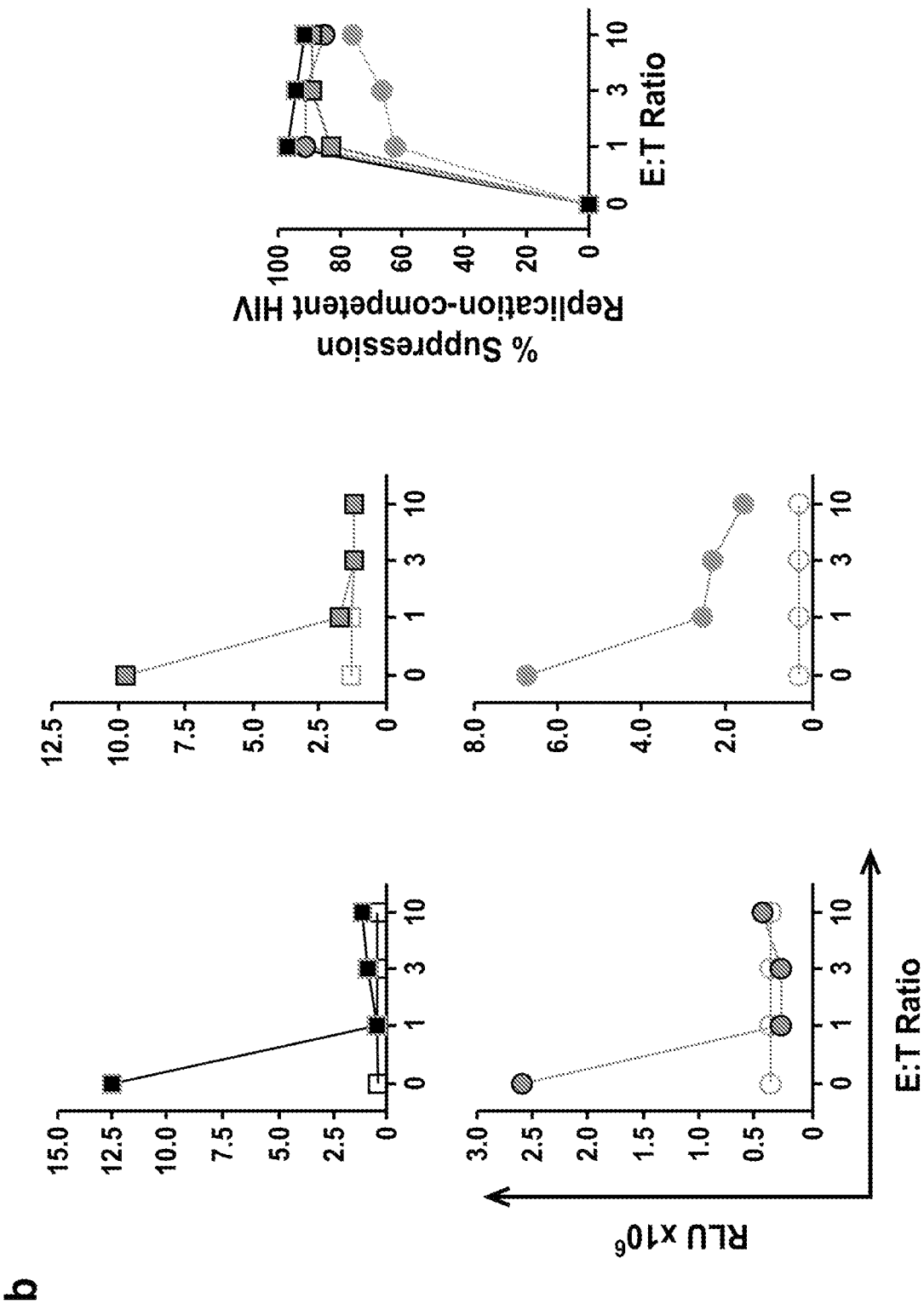

Recent studies have posited that CTL preferentially target cells containing defective HIV-1 proviruses, which in effect act as decoy targets to prevent elimination of the true latent reservoir Pollack RA, 2017; Bruner KM, 2016; Huang SH, 2018). Therefore, whether MDC1-mediated LR activity unmasked cells harboring replication-competent virus that can be subsequently recognized and killed by the CTL was determined. To do so, culture supernatants collected from viral outgrowth assays at various effector-to-target ratios (FIG. 8a) were subsequently cultured on TZM-bl reporter cells (Sanyal A, 2017) for quantification of infectious HIV-1 (FIG. 8b). Importantly, it was found that MDC1 LR activity exposed those targets harboring replication-competent virus, whose dose-dependent elimination (FIG. 8b, Left) resulted in 84.5%±6.7% suppression of replication-competent HIV-1 (FIG. 8b, Right). Thus, MDC1-primed HIV-1-specific autologous CTL were capable of eliminating HIV-1-infected cells harboring replication-competent virus following their subsequent unveiling through the LR activity of MHC-class II antigen-presenting MDC1.

Example 7: Using MDC1 to Identify and Isolate HIV-1 Infected Cells

Figure 10A:
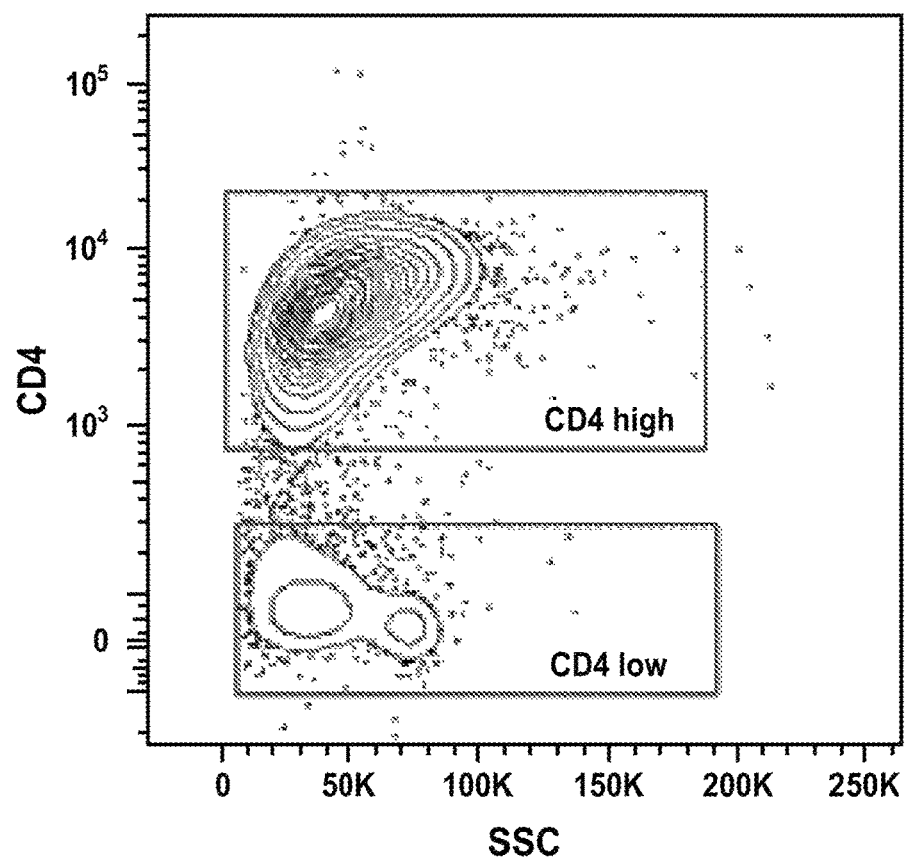
FIG. 10(a-b) shows live HIV-1-infected cells undergoing DC-induced latency reversal can be purified based on early loss of CD4 expression. Resting CD4+ cells containing latently infected cells derived from an HIV+ MACS participant on ART were induced to undergo latency reversal by co-culturing them with autologous MDC1 expressing CMV antigen. The activated T cells were subsequently tested for CD4 expression by flow cytometry on day 15. a) The cells were differentially sorted based on CD4 expression. b) The differentially live-sorted and -unsorted cells were tested for copies of HIV DNA per cell by PCR analysis. Greater than 95% of the viable T cells flow cytometry sorted based on loss of CD4 surface expression (CD4$^{low}$) tested positive for HIV-1 DNA. The shown data are representative of 3 individual experiments performed that consistently yielded similar results.
Figure 10B:
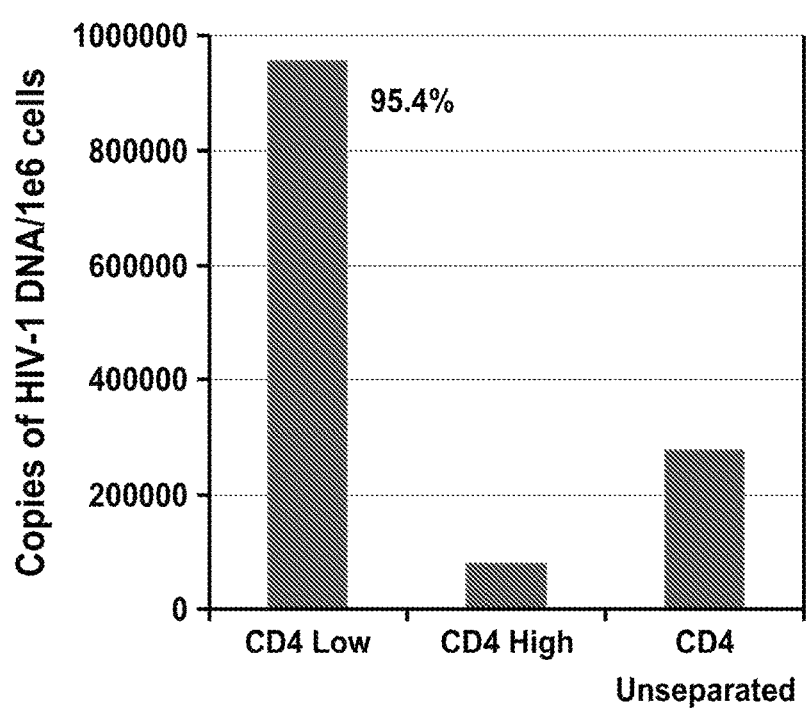

CMV/HIV-1 antigen-loaded monocyte-derived DCs (MDC1s) were co-cultured with autologous resting CD4$^+$ T cells isolated from HIV+study participants and the onset of latency reversal was determined based on early downregulation or loss of CD4 surface expression on the stimulated T cells. The CD4$^{neg/low}$ and the CD4$^{positive}$ T cell populations were sorted and their relative expression of HIV-1 DNA per cell was tested by PCR analysis. This technique was tested in the presence of antiretroviral drugs, including either efavirenz or maraviroc. Using this approach, a highly enriched population of CD4$^+$ T cells testing positive for HIV DNA (greater than 95%) were isolated from the cells that have downregulated CD4 surface expression (FIG. 10). This method is particularly useful in that live and functional HIV-1-infected cells undergoing latency reversal can be isolated from PBMC without the need to test for direct expression of HIV-associated proteins or antigens (such as through intracellular staining of HIV-Gag-p24), using procedures which would otherwise result in the death of these cells. In addition to using flow cytometry to sort HIV-1-infected cells, anti-CD4 magnetic bead separation can alternatively be used to enhance the purity and isolation of HIV-1-infected cells through negative isolation (removing the CD4$^+$ cells). These techniques can therefore be used to isolate the dendritic cell-responsive HIV-1-infected cells for further analysis (i.e., to determine antigen-specific TCR sequences), to perform functional studies on the HIV-1-infected cells, or to further drive HIV-1 production from these live-sorted cells (for additional viral analysis or viral antigen production).

REFERENCES

1. Ruelas D S, Greene W C. An integrated overview of HIV-1 latency. Cell. 2013; 155(3):519-29.
2. Bruner K M, Hosmane N N, Siliciano R F. Towards an HIV-1 cure: measuring the latent reservoir. Trends Microbiol. 2015; 23(4):192-203.
3. Deeks S G. HIV: Shock and kill. Nature. 2012; 487(7408): 439-40.
4. Jones R B, Walker B D. HIV-specific CD8 (+) T cells and HIV eradication. J Clin Invest. 2016; 126(2):455-63.
5. Goulder P J, Watkins D I. HIV and SIV CTL escape: implications for vaccine design. Nat Rev Immunol. 2004; 4(8):630-40.
6. Boucau J, Le Gall S. Antigen processing and presentation in HIV infection. Mol Immunol. 2018.
7. Mailliard R B, Smith K N, Fecek R J, Rappocciolo G, Nascimento E J, Marques E T, et al. Selective Induction of CTL Helper Rather Than Killer Activity by Natural Epitope Variants Promotes Dendritic Cell-Mediated HIV-1 Dissemination. J Immunol. 2013; 191(5):2570-80.
8. Smith K N, Mailliard R B, Piazza P A, Fischer W, Korber B T, Fecek R J, et al. Effective Cytotoxic T Lymphocyte Targeting of Persistent HIV-1 during Antiretroviral Therapy Requires Priming of Naive CD8$^+$ T Cells. mBio. 2016; 7(3).
9. Pollack R A, Jones R B, Pertea M, Bruner K M, Martin A R, Thomas A S, et al. Defective HIV-1 Proviruses Are Expressed and Can Be Recognized by Cytotoxic T Lymphocytes, which Shape the Proviral Landscape. Cell host & microbe. 2017; 21(4):494-506.e4.
10. Bullen C K, Laird G M, Durand C M, Siliciano J D, Siliciano R F. New ex vivo approaches distinguish effective and ineffective single agents for reversing HIV-1 latency in vivo. Nature medicine. 2014; 20(4):425-9.
11. Clutton G, Xu Y, Baldoni P L, Mollan K R, Kirchherr J, Newhard W, et al. The differential short- and long-term effects of HIV-1 latency-reversing agents on T cell function. Scientific reports. 2016; 6:30749.
12. Lam A P, Sparano J A, Vinciguerra V, Ocean A J, Christos P, Hochster H, et al. Phase II study of paclitaxel plus the protein kinase C inhibitor bryostatin-1 in advanced pancreatic carcinoma. Am J Clin Oncol. 2010; 33(2):121-4.
13. Smith B D, Jones R J, Cho E, Kowalski J, Karp J E, Gore S D, et al. Differentiation therapy in poor risk myeloid malignancies: Results of a dose finding study of the combination bryostatin-1 and G M-CSF. Leuk Res. 2011; 35(1):87-94.
14. Morgan R J, Jr., Leong L, Chow W, Gandara D, Frankel P, Garcia A, et al. Phase II trial of bryostatin-1 in combination with cisplatin in patients with recurrent or persistent epithelial ovarian cancer: a California cancer consortium study. Invest New Drugs. 2012; 30(2):723-8.
15. Ajani J A, Jiang Y, Faust J, Chang B B, Ho L, Yao J C, et al. A multi-center phase II study of sequential paclitaxel and bryostatin-1 (NSC 339555) in patients with untreated, advanced gastric or gastroesophageal junction adenocarcinoma. Invest New Drugs. 2006; 24(4):353-7.
16. Gutierrez C, Serrano-Villar S, Madrid-Elena N, Perez-Elias M J, Martin M E, Barbas C, et al. Bryostatin-1 for latent virus reactivation in HIV-infected patients on anti-retroviral therapy. AIDS. 2016; 30(9):1385-92.
17. Jones R B, O'Connor R, Mueller S, Foley M, Szeto G L, Karel D, et al. Histone deacetylase inhibitors impair the elimination of HIV-infected cells by cytotoxic T-lymphocytes. PLOS pathogens. 2014; 10(8): e1004287.
18. Zhao M, De Crignis E, Rokx C, Verbon A, van Gelder T, Mahmoudi T, et al. T cell toxicity of HIV latency reversing agents. Pharmacol Res. 2019; 139:524-34.
19. Tsai A, Irrinki A, Kaur J, Cihlar T, Kukolj G, Sloan D D, et al. Toll-Like Receptor 7 Agonist GS-9620 Induces HIV Expression and HIV-Specific Immunity in Cells from HIV-Infected Individuals on Suppressive Antiretroviral Therapy. J Virol. 2017; 91(8).
20. Borducchi E N, Cabral C, Stephenson K E, Liu J, Abbink P, Ng'ang'a D, et al. Ad26/MVA therapeutic vaccination with TLR7 stimulation in SIV-infected rhesus monkeys. Nature. 2016; 540(7632):284-7.
21. Borducchi E N, Liu J, Nkolola J P, Cadena A M, Yu W H, Fischinger S, et al. Publisher Correction: Antibody and TLR7 agonist delay viral rebound in SHIV-infected monkeys. Nature. 2018; 564(7734): E8.
22. Vibholm L, Schleimann M H, Hojen J F, Benfield T, Offersen R, Rasmussen K, et al. Short-Course Toll-Like Receptor 9 Agonist Treatment Impacts Innate Immunity and Plasma Viremia in Individuals With Human Immunodeficiency Virus Infection. Clin Infect Dis. 2017; 64(12):1686-95.
23. Richman D D, Margolis D M, Delaney M, Greene W C, Hazuda D, Pomerantz R J. The challenge of finding a cure for HIV infection. Science. 2009; 323(5919):1304-7.
24. Connolly N C, Whiteside T L, Wilson C, Kondragunta V, Rinaldo C R, Riddler S A. Therapeutic immunization with human immunodeficiency virus type 1 (HIV-1) peptide-loaded dendritic cells is safe and induces immunogenicity in HIV-1-infected individuals. Clinical and vaccine immunology: CVI. 2008; 15(2):284-92.
25. Garcia F, Climent N, Guardo A C, Gil C, Leon A, Autran B, et al. A dendritic cell-based vaccine elicits T cell responses associated with control of HIV-1 replication. Science translational medicine. 2013; 5(166):166ra2.
26. Brezar V, Ruffin N, Richert L, Surenaud M, Lacabaratz C, Palucka K, et al. Decreased HIV-specific T-regulatory responses are associated with effective D C-vaccine induced immunity. PLOS pathogens. 2015; 11(3): e1004752.
27. Levy Y, Thiebaut R, Montes M, Lacabaratz C, Sloan L, King B, et al. Dendritic cell-based therapeutic vaccine elicits polyfunctional HIV-specific T-cell immunity associated with control of viral load. Eur J Immunol. 2014; 44(9):2802-10.
28. Macatangay B J, Riddler S A, Wheeler N D, Spindler J, Lawani M, Hong F, et al. Therapeutic Vaccination With Dendritic Cells Loaded With Autologous HIV Type 1-Infected Apoptotic Cells. The Journal of infectious diseases. 2016; 213(9):1400-9.
29. Zaccard C R, Watkins S C, Kalinski P, Fecek R J, Yates A L, Salter R D, et al. CD40L induces functional tunneling nanotube networks exclusively in dendritic cells programmed by mediators of type 1 immunity. J Immunol. 2015; 194(3):1047-56.
30. Cella M, Scheidegger D, Palmer-Lehmann K, Lane P, Lanzavecchia A, Alber G. Ligation of CD40 on dendritic cells triggers production of high levels of interleukin-12 and enhances T cell stimulatory capacity: T-T help via APC activation. J Exp Med. 1996; 184(2):747-52.
31. Sanyal A, Mailliard R B, Rinaldo C R, Ratner D, Ding M, Chen Y, et al. Novel assay reveals a large, inducible, replication-competent HIV-1 reservoir in resting CD4 (+) T cells. Nature medicine. 2017; 23(7):885-9.
32. Mailliard R B, Wankowicz-Kalinska A, Cai Q, Wesa A, Hilkens C M, Kapsenberg M L, et al. alpha-type-1 polarized dendritic cells: a novel immunization tool with optimized CTL-inducing activity. Cancer Res. 2004; 64(17):5934-7.
33. Spina C A, Anderson J, Archin N M, Bosque A, Chan J, Famiglietti M, et al. An in-depth comparison of latent HIV-1 reactivation in multiple cell model systems and resting CD4+ T cells from aviremic patients. PLOS pathogens. 2013; 9(12): e1003834.
34. Feau S, Garcia Z, Arens R, Yagita H, Borst J, Schoenberger S P. The CD4 (+) T-cell help signal is transmitted from APC to CD8 (+) T-cells via CD27-CD70 interactions. Nature communications. 2012; 3:948.
35. Bennett S R, Carbone F R, Karamalis F, Flavell R A, Miller J F, Heath W R. Help for cytotoxic-T-cell responses is mediated by CD40 signalling. Nature. 1998; 393 (6684):478-80.
36. Ridge J P, Di Rosa F, Matzinger P. A conditioned dendritic cell can be a temporal bridge between a CD4+ T-helper and a T-killer cell. Nature. 1998; 393(6684):474-8.
37. Schoenberger S P, Toes R E, van der Voort E I, Offringa R, Melief C J. T-cell help for cytotoxic T lymphocytes is mediated by CD40-CD40L interactions. Nature. 1998; 393(6684):480-3.
38. Chen B K, Gandhi R T, Baltimore D. CD4 down-modulation during infection of human T cells with human immunodeficiency virus type 1 involves independent activities of vpu, env, and nef. J Virol. 1996; 70(9):6044-53.
39. Demoustier A, Gubler B, Lambotte O, de Goer M G, Wallon C, Goujard C, et al. In patients on prolonged HAART, a significant pool of HIV infected CD4 T cells are HIV-specific. AIDS. 2002; 16(13):1749-54.
40. Douek D C, Brenchley J M, Betts M R, Ambrozak D R, Hill B J, Okamoto Y, et al. HIV preferentially infects HIV-specific CD4+ T cells. Nature. 2002; 417(6884):95-8.
41. Stone S F, Price P, French M A. Cytomegalovirus (CMV)-specific CD8+ T cells in individuals with HIV infection: correlation with protection from CMV disease. J Antimicrob Chemother. 2006; 57(4):585-8.
42. Abana C O, Pilkinton M A, Gaudieri S, Chopra A, McDonnell W J, Wanjalla C, et al. Cytomegalovirus (CMV) Epitope-Specific CD4 (+) T Cells Are Inflated in HIV (+) CMV (+) Subjects. J Immunol. 2017; 199(9): 3187-201.
43. Li H, Margolick J B, Bream J H, Nilles T L, Langan S, Bui H T, et al. Heterogeneity of CD4+ and CD8+ T-cell responses to cytomegalovirus in HIV-infected and HIV-uninfected men who have sex with men. The Journal of infectious diseases. 2014; 210(3):400-4.
44. Maile R, Siler C A, Kerry S E, Midkiff K E, Collins E J, Frelinger J A. Peripheral "CD8 tuning" dynamically modulates the size and responsiveness of an antigen-specific T cell pool in vivo. J Immunol. 2005; 174(2): 619-27.
45. Bruner K M, Murray A J, Pollack R A, Soliman M G, Laskey S B, Capoferri A A, et al. Defective proviruses rapidly accumulate during acute HIV-1 infection. Nat Med. 2016; 22(9):1043-9.
46. Huang S H, Ren Y, Thomas A S, Chan D, Mueller S, Ward A R, et al. Latent HIV reservoirs exhibit inherent resistance to elimination by CD8+ T cells. J Clin Invest. 2018; 128(2):876-89.

What is claimed is:

1. A method of reversing HIV-1 latency in a CD4$^+$ T cell in a subject, comprising:
   a) obtaining one or more mature monocyte-derived dendritic cells (MDCs) having a herpesvirus peptide bound to a Class II MHC molecule; and
   b) administering to the subject an effective amount of the one or more MDCs of step a) and thereby reversing the HIV-1 latency.

2. The method of claim 1, wherein the herpesvirus peptide is a CMV pp65 peptide.

3. The method of claim 1, wherein the subject is a human that has had an HIV-1 antiretroviral therapy (ART).

4. The method of claim 1, wherein the herpesvirus peptide is a CMV peptide, a varicella-zoster virus peptide, an Epstein-Barr virus peptide, or a herpes simplex virus type 1 peptide.

5. The method of claim 1, wherein the herpesvirus peptide is a CMV peptide.

6. The method of claim 5, wherein the subject is a human that has had an HIV-1 antiretroviral therapy (ART).

7. The method of claim 2, wherein the subject is a human.

8. The method of claim 2, wherein the subject is a human that has had an HIV-1 antiretroviral therapy (ART).

* * * * *